United States Patent
Ueda

(10) Patent No.: US 7,643,656 B2
(45) Date of Patent: Jan. 5, 2010

(54) METHOD OF EVALUATING OPTICAL CHARACTERISTIC VALUES OF AN IMAGE, DEVICE FOR SUPPORTING EVALUATION OF IMAGE, AND IMAGE PROCESSING APPARATUS

(75) Inventor: Masashi Ueda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 692 days.

(21) Appl. No.: 11/213,921

(22) Filed: Aug. 30, 2005

(65) Prior Publication Data

US 2006/0078169 A1 Apr. 13, 2006

(30) Foreign Application Priority Data

Oct. 7, 2004 (JP) .............................. 2004-294759

(51) Int. Cl.
*G06K 9/00* (2006.01)
(52) U.S. Cl. ..................................................... 382/112
(58) Field of Classification Search ................. 382/100, 382/101, 112, 181, 167, 287; 358/1.9, 3.26, 358/500–518, 530, 406; 250/559–564, 571–575
See application file for complete search history.

(56) References Cited

U.S. PATENT DOCUMENTS 6,035,065 A * 3/2000 Kobayashi et al. .......... 382/201
6,571,000 B1 * 5/2003 Rasmussen et al. ......... 382/112
6,597,473 B1 * 7/2003 Rasmussen et al. ......... 358/1.9

FOREIGN PATENT DOCUMENTS

| JP | 1286084 | 11/1989 |
|---|---|---|
| JP | 7220083 | 8/1995 |
| JP | 2000 194852 | 7/2000 |
| JP | 2000 207560 | 7/2000 |

* cited by examiner

*Primary Examiner*—Samir A. Ahmed
*Assistant Examiner*—Atiba O Fitzpatrick
(74) *Attorney, Agent, or Firm*—Banner & Witcoff, LTD

(57) ABSTRACT

A method of evaluating an image, including: (a) obtaining evaluation-image data of an evaluation image to be evaluated, the evaluation-image data including coordinate-position data indicative of coordinate positions in the evaluation image and optical-characteristic-value data indicative of optical characteristic values at respective coordinate positions; (b) identifying, based on the evaluation-image data, a characteristic-value fluctuation which is a fluctuation of the optical characteristic values of the evaluation image in relation to the coordinate positions; (c) estimating, based on the evaluation-image data, an unperceivable low-frequency-fluctuation component which is one component of the characteristic-value fluctuation and which is a component that cannot be perceived due to a considerably low frequency of the fluctuation; and (d) evaluating the evaluation image based on the characteristic-value fluctuation and the unperceivable low-frequency-fluctuation component.

21 Claims, 10 Drawing Sheets

METHOD OF EVALUATING OPTICAL CHARACTERISTIC VALUES OF AN IMAGE, DEVICE FOR SUPPORTING EVALUATION OF IMAGE, AND IMAGE PROCESSING APPARATUS

The present application is based on Japanese Patent Application No. 2004-294759 filed on Oct. 7, 2004, the contents of which are incorporated herein by reference.

BACKGROUND OF THE INVENTION

1. Field of the Invention

The present invention relates in general to a method of evaluating an image formed by an image forming device or the like, in terms of its quality, etc., a device used for supporting the evaluation of the image, and an image processing apparatus having a function of supporting evaluation of its own image forming characteristic.

2. Discussion of Related Art

In evaluating an image formed by an image forming device such as a copying machine, a printer, a facsimile machine, etc., or in evaluating an image forming characteristic of such an image forming device, a spatial-frequency characteristic obtained by Fourier transformation is analyzed for the evaluation, as disclosed in JP-A-2000-207560, JP-A-2000-194852, JP-A-7-220083, and JP-A-1-286084, for instance.

The evaluation of the image by analyzing the spatial-frequency characteristic as disclosed in the Publication documents indicated above suffers from low resolution of a low-frequency component (i.e., a noise component having a relatively long cycle) in a power spectrum of noise of the image indicative of characteristics such as an irregularity in the formed image. The term "cycle" is used in synonymous with a term "wavelength" in the image analyzing technique. This is due to a small number of samplings of noise of the low-frequency component. Therefore, for improving evaluation accuracy of the image on the low-frequency side, the number of samplings of the low-frequency noise component needs to be increased. In this case, a sampling region from which information of the image is to be obtained needs to be made large. For instance, where it is desired to obtain a noise component of a certain cycle with high accuracy, the sampling region is required to have a size which is at least several or several tens of times of the cycle. At present, commercially available image forming devices generally have an image forming region of A4 size, for instance. For evaluating, as the image forming characteristic of the image forming devices, a degree of image irregularity or the like having a cycle of several or several tens of fractions of the A4 size, it is required to perform sampling from a region having a size which is at least exceeds the A4 size or, depending upon cases, a region having a size which is several or several tens of times of the A4-exceeded size. In this respect, it is rather difficult to form an image having such a wide sampling region and it is not realistic or practical to carry out the image evaluation by obtaining the image information from such a wide sampling region.

SUMMARY OF THE INVENTION

The above-indicated problem is merely one example of various problems experienced in the conventional image evaluation by the analysis of the spatial-frequency characteristic. Namely, the image evaluation by the analysis of the spatial-frequency characteristic experiences various problems similar to or different from the above-indicated problem. Therefore, there is much room for improvement of the utility of the image evaluation. The invention has been developed in the light of such situations. It is therefore an object of the invention to provide a method of evaluating an image by which practical image evaluation can be performed, a device for supporting image evaluation which can support practical image evaluation, or an image processing apparatus having a function of practically evaluating its own image forming characteristic.

To achieve the object indicated above, the image evaluating method according to the invention is characterized by evaluating an image based on: a characteristic-value fluctuation which is a fluctuation of optical characteristic values of an evaluation image in relation to coordinate positions; and an unperceivable low-frequency-fluctuation component which is one component of the characteristic-value fluctuation and which is a component that cannot be perceived due to a considerably low frequency of the fluctuation. The image-evaluation supporting device according to the invention is characterized by having a function of identifying, based on the characteristic-value fluctuation and the unperceivable low-frequency-fluctuation component, an evaluation index which is an index in evaluating the evaluation image. The image processing apparatus according to the invention is characterized by having functions of: identifying and estimating, based on image information read by its image reading device, the characteristic-value fluctuation and the unperceivable low-frequency-fluctuation component; and identifying the evaluation index based on the characteristic-value fluctuation and the unperceivable low-frequency-fluctuation component.

The present image evaluating method, the present image-evaluation supporting device, and the present image processing device share a common technical feature that the image is evaluated on the basis of the characteristic-value fluctuation and the unperceivable low-frequency-fluctuation component. The conventional image evaluation by analysis of the spatial-frequency characteristic is performed on the basis of the power spectrum which is image characteristic data in frequency space. In contrast, the image evaluation according to the invention is performed on the basis of data indicative of a fluctuation of the optical characteristic values at respective coordinate positions of the image, i.e., image characteristic data in real space. Accordingly, as explained above, owing to the present image evaluation, it is possible to detect, with high accuracy, a noise of a relatively low frequency, i.e., a fluctuation of the optical characteristic values which has a relatively long cycle. Further, the image evaluation is performed while taking into account the unperceivable low-frequency-fluctuation component, thereby assuring practical evaluation which premises visual characteristics of the human beings. For these reasons, the present invention characterized by the image evaluation explained above realizes the image evaluating method, the image-evaluation supporting device, and the image processing apparatus which have high utility.

FORMS OF THE INVENTION

There will be described in detail various forms of an invention which are considered claimable. Each of the forms of the invention is numbered like the appended claims and depends from the other form or forms, where appropriate, for easier understanding of the invention. It is to be understood that the invention is not limited to the technical features or any combinations thereof which will be described, and shall be construed in the light of the following descriptions of the various forms and preferred embodiments of the invention. It is to be further understood that a plurality of elements or features included in any one of the following forms of the invention are not necessarily provided all together, and that any form in which one or more elements or one or more features is/are added to any one of the following forms and any form in which one or more elements or one or more features is/are deleted from any one of the following forms may be considered claimable.

(1) A method of evaluating an image, comprising:

(a) obtaining evaluation-image data of an evaluation image to be evaluated, the evaluation-image data including coordinate-position data indicative of coordinate positions in the evaluation image and optical-characteristic-value data indicative of optical characteristic values at respective coordinate positions;

(b) identifying, based on the evaluation-image data, a characteristic-value fluctuation which is a fluctuation of the optical characteristic values of the evaluation image in relation to the coordinate positions;

(c) estimating, based on the evaluation-image data, an unperceivable low-frequency-fluctuation component which is one component of the characteristic-value fluctuation and which is a component that cannot be perceived due to a considerably low frequency of the fluctuation; and (d) evaluating the evaluation image based on the characteristic-value fluctuation and the unperceivable low-frequency-fluctuation component.

The above-indicated form (1) is one basic form of a method of evaluating an image, which is considered to be a claimable invention. (Hereinafter, the method according to this form may be referred to as "the image evaluating method according to the basic form" where appropriate.) Briefly, this form is characterized by evaluating an image on the basis of the characteristic-value fluctuation and the unperceivable low-frequency-fluctuation component described above. The characteristic-value fluctuation and the unperceivable low-frequency-fluctuation component are data indicative of a fluctuation of the optical-characteristic values of the image in relation to the coordinate positions, namely, image characteristic data in real space. As explained above, in the conventional image evaluating method by analysis of the spatial-frequency characteristic, the evaluation is performed based on the power spectrum which is image characteristic data in frequency space. Therefore, the conventional method suffers from a problem that a relatively low-frequency noise, i.e., a relatively long-cycle fluctuation in the optical characteristic values cannot be accurately detected. In contrast, the image evaluating method according to the above-indicated form (1) is capable of accurately detecting the long-cycle fluctuation in the optical characteristic values, whereby allowing image evaluation which assures highly accurate detection of the low-frequency noise of the image. More specifically described, where the image data is obtained in a sampling region with a certain size, the method according to this form (1) permits effective evaluation with respect to a low-frequency fluctuation whose cycle is several fractions of the size of the sampling region. The method assuring such advantages has high utility.

The above-described form (1) is characterized by performing image evaluation while considering the unperceivable low-frequency fluctuation component. In the visual sense of the human beings, a considerably long-cycle fluctuation in the optical characteristic values cannot be perceived. Described in detail, in a case of an image of a A4 size, for instance, a gradual or smooth fluctuation cannot be perceived in which the longitudinal dimension (the length) of the A4 size corresponds to a half cycle, one cycle, two or more cycles, for example. Accordingly, even if such a fluctuation is excluded in evaluating the image, it is supposed that demerits due to the exclusion are not so large. Further, since a perceivable low-frequency fluctuation component is accurately recognized or specified in evaluating the image, it is desirable to exclude the unperceivable low-frequency fluctuation component. The exclusion of the unperceivable low-frequency component is one example of considering it in the image evaluation. By thus considering the unperceivable low-frequency component in the image evaluation, it is possible to perform practical image evaluation which takes into account the visual characteristics of the human beings. In this respect, the image evaluating method according to this form (1) assures high utility.

It is preferable that "evaluation image" on which evaluation is to be made is an image with a relatively monotonous pattern. It is more preferable that "evaluation image" is an image which is formed with intention that the optical characteristic values are uniform over the entirety of the image, namely, a solid image. Further, where the image evaluation is performed for the purpose of evaluating the image forming characteristic of the image forming device which forms the image, "evaluation image" preferably has a size as large as possible, in the light of the feature of the image evaluating method according to this form (1) that the relatively long-cycle fluctuation in the optical characteristic values can be evaluated with high accuracy. More preferably, "evaluation image" has a maximum size that can be achieved by the image forming device. Further, "evaluation image" may be a color image constituted by a plurality of colors of inks or a monocolor image constituted by a single color of ink.

"Evaluation-image data" obtained in (a) the obtaining evaluation-image data (hereinafter may be referred to as "(a) the evaluation-image-data obtaining process) is image data which is a base of the image evaluation, and includes the above-indicated "coordinate-position data" and "optical-characteristic-value data", in relation to the evaluation image. "Coordinate-position data" may be constituted by data of values which indicate coordinate positions, in other words, positions on a two-dimensional coordinate system or plane such as a rectangular coordinate system or a polar coordinate system, where the evaluation image is a two-dimensional image, for instance. "Optical-characteristic-value data" is related to the coordinate positions. Accordingly, "evaluation-image data" is a set of data represented by $C(x, y)$ where the optical characteristic values are represented by C and the coordinate positions are represented by $(x, y)$ as values on the two-dimensional rectangular coordinate system. Here, "optical characteristic values" are numerically expressed hue, lightness, chroma, and the like. More specifically described, it is possible to employ, as the "optical characteristic values", at least one of: various parameters or color difference of various colorimetric systems such as Munsell colorimetric system, $L^*a^*b^*$ colorimetric system, $L^*C^*h^*$ colorimetric system, Hunter Lab colorimetric system, and XYZ (Yxy) colorimetric system; and tristimulus values $(X, Y, Z)$. In a case where a colorless solid image is used as the evaluation image, it is possible to employ concentration as the optical characteristic values. "Optical characteristic values" may be measured using an image-information reading device such as a colorimeter, a spectral colorimeter, a scanner, or the like. "Optical characteristic values" may be obtained as follows: The optical characteristic values obtained by the measurement are converted into arbitrary another optical characteristic values, and the converted values may be made as optical characteristic values constituting the optical-characteristic data. "Evaluation-image data" may be sampled from an arbitrary part of the evaluation image, or from the entirety of the evaluation image. In the present form (1), "(a) the evaluation-image data obtaining process" may be constituted by including a process of measuring the optical characteristic values using the image-information reading device explained above, or may be constituted by a process in which evaluation-image data separately obtained by measurement is prepared to be available in the following process to be performed after (a) the image-data obtaining process.

"Characteristic-value fluctuation" to be identified in (b) the identifying a characteristic-value fluctuation (hereinafter may be referred to as "(b) the characteristic-value-fluctuation identifying process") may be identified in any suitable arrangement, as long as it can be recognized how the optical characteristic values fluctuate with respect to the coordinate positions. In other words, in (b) the characteristic-value-fluctuation identifying process, the characteristic-value fluctuation may be identified such that the optical characteristic values at respective arbitrary coordinate positions can be grasped and such that relationship between the optical characteristic value at the arbitrary coordinate position and the optical characteristic value at another arbitrary coordinate position can be grasped. Described more specifically, where the coordinate positions are defined in the two-dimensional rectangular coordinate system, for instance, the characteristic-value fluctuation may be identified as a set of data in which the optical characteristic values are represented by $C(x, y)$, or as a function represented by $C=f(x, y)$ and using the coordinate position as a variable or parameter. In (b) the characteristic-value-fluctuation identifying process, the characteristic-value fluctuation may be identified by directly employing the evaluation-image data obtained in (a) the evaluation-image data obtaining process, or by performing any suitable operation on the evaluation-image data. As the suitable operation, there may be employed various operation such as: operation in which a range from which the evaluation-image data is identified is limited to only a part of the sampling region; operation of performing transformation from a polar coordinate system to a rectangular coordinate system, for instance; operation of identifying a one-dimensional characteristic-value fluctuation in a specific direction on the basis of the evaluation-image data related to positions on a two-dimensional coordinate system; operation of converting the obtained optical-characteristic values into another optical characteristic values; and operation of excluding a predetermined frequency component.

"Unperceivable low-frequency-fluctuation component" estimated in (c) the estimating an unperceivable low-frequency-fluctuation component (hereinafter may be referred to as "(c) the unperceivable-low-frequency-fluctuation-component estimating process") is a fluctuation component contained in the above-indicated characteristic-value fluctuation, and is a noise component having a long cycle that cannot be perceived or recognized by the visual sense of the human beings. It is not particularly limited as to the degree of the cycle of the fluctuation component that will be estimated as the unperceivable low-frequency-fluctuation component. As explained above, however, in a case where the image has an A4 size, for instance, a gradual or smooth fluctuation component is unperceivable in which the longitudinal dimension of the A4 size corresponds to about a half cycle, about one cycle, or about two or more cycles, for instance. In this process, it is possible to estimate such a low-frequency fluctuation component as the unperceivable low-frequency-fluctuation component. "Unperceivable low-frequency-fluctuation component" may be identified in any arrangement. Like the above-indicated characteristic-value fluctuation, the unperceivable low-frequency-fluctuation component may be identified as a set of data represented by $C_{LOW}(X, Y)$, for instance, or a function represented by $C_{LOW}=f(x, y)$, for instance. The operation of estimating the unperceivable low-frequency-fluctuation component from the evaluation-image data is not particularly limited. Where the unperceivable low-frequency-fluctuation component is estimated in the form of the function, it is possible to perform, for instance, operation of forming a simulation function using the coordinate position as a variable (which operation will be explained in greater detail). Where the unperceivable low-frequency-fluctuation component is estimated in the form of the set of data of the unperceivable low-frequency-fluctuation-component values which are related to the coordinate positions, it is possible to perform, for instance, operation according to an average sampling method (which will be explained) in which a relatively large region is employed as the sampling region. Further, like the above-indicated characteristic-value fluctuation, the unperceivable low-frequency-fluctuation component may be estimated by operation of performing coordinate transformation, operation of specifying a one-dimensional characteristic-value fluctuation, operation of converting the obtained optical characteristic values into another optical characteristic values, and so on. While the unperceivable low-frequency-fluctuation component is estimated on the basis of the evaluation-image data, the component may be directly estimated on the basis of the evaluation-image data obtained in (a) the evaluation-image-data obtaining process, or indirectly estimated on the basis of the characteristic-value fluctuation identified based on the evaluation-image data, in the (c) the unperceivable-low-frequency-fluctuation-component estimating process.

Operation in (d) the evaluating the evaluation image" (hereinafter may be referred to as "(d) the evaluation-image evaluating process) is not particularly limited, as long as the evaluation is made on the basis of the identified characteristic-value fluctuation while taking into account the estimated unperceivable low-frequency-fluctuation component. For instance, in (d) the evaluation-image evaluating process, operation according to any suitable mathematical or statistical techniques may be performed on the characteristic-value fluctuation and the unperceivable low-frequency-fluctuation component, and the evaluation may be made on the basis of the result of the operation. More specifically explained, there may be identified an unperceivable-low-frequency-component-excluded fluctuation component by excluding the unperceivable low-frequency-fluctuation component from the characteristic-value fluctuation, and the evaluation may be made based on the identified fluctuation component. This operation will be explained in greater detail. It is noted that the evaluation may be simple one in which the grade or quality of the image is merely judged to be good or poor, or complicated one in which the image irregularity is analyzed by specifying the cycle and/or the amplitude of the image irregularity. Moreover, as explained below, there may be performed operation of calculating an index value for the evaluation, and the evaluation may be made on the basis of the calculated index value. The purpose of the evaluation is not particularly limited. For instance, the evaluation may be made for the purpose of merely determining the grade or quality of the evaluation image per se, or for the purpose of evaluating the image forming characteristic of the image forming device that forms the image.

In the image evaluating method according to the basic form, all of the processes or a part of the processes may be implemented utilizing a computer or the like. In this instance, final evaluation may be performed by a person who is engaged in the evaluation or by the computer.

(2) The method according to the above form (1), wherein (d) the evaluating the evaluation image comprises evaluating a degree of irregularity in the evaluation image.

The above-indicated form (2) is a form in which the evaluation item to be evaluated in (d) the evaluation-image evaluating process is limited in the image evaluating method according to the basic form. "Irregularity in the evaluation image" in this form (2) (hereinafter may be referred to as "the image irregularity") means a phenomenon or status in which the optical characteristic values in relation to the positions in the image are not even. (In this respect, the "irregularity in the evaluation image" may be hereinafter referred to as "the image irregularity or unevenness".) Where the evaluation image is formed by an image forming device arranged to form an image by attaching respective predetermined amounts of coloring materials onto predetermined locations of the image-formation medium, there may be caused image irregularity in terms of the concentration of the image, the color of the image, and so on, due to deviation of the attaching locations from the nominal locations, inaccuracy in the attaching amounts of the respective coloring materials, etc. Therefore, by evaluating the degree of the image irregularity, the image forming characteristic of the image forming device such as its accuracy and performance can be evaluated. The image irregularity which arises from the image forming device tends to emerge or appear as a periodical fluctuation in the optical characteristic values, for example. Further, such a fluctuation tends to emerge as a relatively long-cycle, namely, a relatively low-frequency fluctuation. For instance, where the image forming device has an image forming head and forms an image while moving the head and where the image forming device has a feeder for feeding the image-formation medium and forms an image while feeding the image-formation medium, the periodic fluctuation having a cycle in a range from about several millimeters to about several centimeters tends to appear when the image forming device is suffering from structural failure, abnormality, deterioration or the like in a moving mechanism for moving the image forming head and in the feeder. Since the image evaluating method according to the basic form is capable of accurately evaluating the relatively low-frequency fluctuation, the method according to the above-indicated form (2) assures accurate evaluation of the relatively low-frequency image irregularity (i.e., accurate evaluation of banding). Thus, the method according to this form (2) is a suitable method for evaluation of the image forming characteristic of the image forming device.

(3) The method according to the above form (1) or (2), wherein (b) the identifying a characteristic-value fluctuation comprises identifying the characteristic-value fluctuation in a specific direction of the evaluation image, wherein (c) the estimating an unperceivable low-frequency-fluctuation component comprises estimating the unperceivable low-frequency-fluctuation component in the specific direction of the evaluation image, and wherein (d) the evaluating the evaluation image comprises evaluating the evaluation image in the specific direction.

Briefly, the above-indicated form (3) is a form in which a one-dimensional evaluation is performed. The fluctuation in the optical characteristic values of the image is likely to occur in a specific direction. In detail, where the image forming device that forms the evaluation image is configured to have the head moving mechanism for moving the image forming head and the feeder for feeding the image-formation medium, for instance, the fluctuation in the optical characteristic values generated by the structural failure in the moving mechanism or the feeder is likely to occur in the moving direction of the image-forming head or the feeding direction of the image-formation medium. The image evaluating method according to this form (3) is suitable in evaluating the image in which the fluctuation in the optical characteristic values occurs in a specific direction. Further, the method according to this form (3) is suitable for image evaluation which aims at evaluating the image forming characteristic of the image forming device. In a case where the evaluation-image data is data in relation to the positions on the two-dimensional coordinate system, one-dimensional operation utilizing any suitable mathematical or statistical techniques may be performed on the evaluation-image data in a specific direction, thereby allowing the image evaluation in the specific direction. It is noted that the above-indicated form (3) does not exclude image evaluation in two or more specific directions. For instance, the image evaluation may be performed in a first direction as one arbitrary specific direction, and the image evaluation may be performed in a second direction as another specific direction intersecting the first direction, thereby allowing two-dimensional image evaluation.

(4) The method according to any one of the above forms (1)-(3), wherein (d) the evaluating the evaluation image comprises: identifying, based on the characteristic-value fluctuation and the unperceivable low-frequency-fluctuation component, an evaluation index which is an index in evaluating the evaluation image; and evaluating the evaluation image based on the evaluation index.

"Evaluation index" in the above-indicated form (4) means a parameter for supporting the image evaluation. By identifying the evaluation index and performing the evaluation utilizing the identified evaluation index, the convenience, the easiness, the accuracy, and the like in the evaluation are improved. "Evaluation index" is not particularly limited, but various parameters may be employed as "evaluation index". More specifically, there may be employed: a maximum value of an absolute value of an unperceivable-low-frequency-component-excluded fluctuation component obtained by excluding the unperceivable low-frequency-fluctuation component from the characteristic-value fluctuation (this maximum value will be explained in greater detail); an average value of the unperceivable-low-frequency-component-excluded fluctuation component; a difference between a maximum value and a minimum value of the unperceivable-low-frequency-component-excluded fluctuation component; a cycle or an amplitude of the unperceivable-low-frequency-component-excluded fluctuation component where that fluctuation component is a periodic fluctuation.

(5) The method according to any one of the above forms (1)-(4), wherein (d) the evaluating the evaluation image comprises: identifying an unperceivable-low-frequency-component-excluded fluctuation component of the evaluation image in relation to the coordinate positions, the unperceivable-low-frequency-component-excluded fluctuation component being obtained by excluding the unperceivable low-frequency-fluctuation component from the characteristic-value fluctuation; and evaluating the evaluation image based on the unperceivable-low-frequency-component-excluded fluctuation component.

It is to be understood that "unperceivable-low-frequency-component-excluded fluctuation component" in the above-indicated form (5) includes a low-frequency fluctuation component of the optical characteristic values that can be perceived by the visual sense of the human beings. Therefore, according to this form (5) which performs the image evaluation based on the unperceivable-low-frequency-component-excluded fluctuation component, the image evaluation which takes into account the visual sense of the human beings can be made in evaluating the relatively long-cycle fluctuation of the optical characteristic values. "Unperceivable-low-frequency-component-excluded fluctuation component" may be identified in any arrangement. Like the above-indicated characteristic-value fluctuation and unperceivable low-frequency-fluctuation component, the unperceivable-low-frequency-component-excluded fluctuation component may be identified as a set of data represented by $C_{LOW}(x, y)$, for instance, or a function represented by $C_{LOW}=f(x, y)$, for instance. The operation for identifying the unperceivable-low-frequency-component-excluded fluctuation component is not particularly limited, but may be performed according to any suitable mathematical or statistical techniques. Where both of the characteristic-value fluctuation and the unperceivable low-frequency-fluctuation component are identified and estimated in the form of a function using the coordinate position as a variable, for instance, it is possible to identify the unperceivable-low-frequency-component-excluded fluctuation component as a function obtained by subtracting the unperceivable low-frequency-fluctuation component from the characteristic-value fluctuation. Where both of the characteristic-value fluctuation and the unperceivable low-frequency-fluctuation component are identified and estimated as a set of data, it is possible to identify unperceivable-low-frequency-component-excluded values obtained by subtracting fluctuation-component values from characteristic values at respective coordinate positions, as a set of data related to the respective coordinate positions.

(6) The method according to the above form (5), which is a method wherein an evaluation index which is an index in evaluating the evaluation image is identified based on the characteristic-value fluctuation and the unperceivable low-frequency-fluctuation component, and wherein the evaluation image is evaluated based on the evaluation index, and wherein (d) the evaluating the evaluation image comprises: identifying the evaluation index based on the unperceivable-low-frequency-component-excluded fluctuation component; and evaluating the evaluation image based on the evaluation index.

The above-indicated form (6) enables evaluation adapted to the visual characteristics of the human beings, in evaluating the relatively long-cycle fluctuation in the optical characteristic values, and improves the convenience, the easiness, the accuracy, and so on in the evaluation.

(7) The method according to the above form (6), wherein (d) the evaluating the evaluation image comprises: identifying, as the evaluation index, a maximum value of an absolute value of the unperceivable-low-frequency-component-excluded fluctuation component; and evaluating the evaluation image based on the maximum value.

The above-indicated form (7) enables recognition of the degree of the concentration or the like at a portion of the evaluation image where the irregularity is the largest. Accordingly, the grade or quality of the evaluation image can be easily evaluated. Further, where the evaluation image is formed by the image forming device, the image forming characteristic of the image forming device can be easily judged to be good or poor.

(8) The method according to any one of the above forms (1)-(7), wherein (c) the estimating an unperceivable low-frequency-fluctuation component comprises forming, based on the evaluation-image data, at least one simulation function which simulates the unperceivable low-frequency fluctuation component and which uses the coordinate position as a variable.

The above-indicated form (8) is a form in which the unperceivable low-frequency-fluctuation component is estimated as a function as described above. "Simulation function" in this form (8) may be regarded as a function that approximates a function indicative of an accurate fluctuation component. It is somewhat difficult to accurately express the fluctuation component by a function. Accordingly, this form (8) utilizing the simulation function enables the unperceivable low-frequency-fluctuation component to be easily identified as the function. For instance, "simulation function" may be formed as a function with two unknowns which uses, as two variables, the respective coordinate positions in two specific directions on a two-dimensional coordinate system. Alternatively, as explained later, "simulation function" may be formed as a function with one unknown which uses, as only one variable, the coordinate position in a specific direction on a one-dimensional coordinate system. In a case where the simulation function is formed as the function with two unknowns, the function to be formed is a function of an approximate curved surface which approximates the unperceivable low-frequency-fluctuation component in real space. Where the simulation function is formed as the function with one unknown, the function to be formed is a function of an approximate curved line. Operation for forming "simulation function" is not particularly limited, and there may be employed various operation according to mathematical or statistical techniques. The operation according to a least square method (which will be explained) is one suitable example of operation for forming the simulation function. The order in the simulation function (the order of the variable in the simulation function) is not particularly limited. If a simulation function of relatively higher order is formed, the degree of approximation is generally increased whereas the operation for forming the simulation function is complicated. On the contrary, if a simulation function of relatively lower order is formed, the operation for forming the simulation function is easy whereas the degree of approximation is generally lowered. Accordingly, the simulation function of suitable order may be formed depending upon the evaluation purpose, etc., while considering evaluation accuracy, permissible operation time, and the like. The simulation function is formed based on the evaluation-image data. In this respect, the simulation function may be formed directly based on the evaluation-image data, or indirectly based on the evaluation-image data, e.g., based on the characteristic-value fluctuation identified on the basis of the evaluation-image data.

(9) The method according to the above form (8), which is a method wherein the characteristic-value fluctuation is identified in a specific direction of the evaluation image, wherein the unperceivable low-frequency-fluctuation component is estimated in the specific direction of the evaluation image, and wherein the evaluation image is evaluated in the specific direction, and wherein (c) the estimating an unperceivable low-frequency-fluctuation component comprises forming, as each of the at least one simulation function, a function of an n-th order which uses the coordinate position in the specific direction as a variable.

Briefly, the above-indicated form (9) is a form in which is performed one-dimensional image evaluation utilizing the simulation function described above. As explained above, the simulation function in this form (9) is a function of the approximate curved line.

(10) The method according to the above form (8) or (9), wherein (c) the estimating an unperceivable low-frequency-fluctuation component comprises forming the at least one simulation function by performing operation according to a least square method on the evaluation-image data.

In the above-indicated form (10), the simulation function is formed according to the least square method. "Least square method" is a suitable mathematical technique for forming an approximate function. According to this technique, the simulation function with a high degree of approximation can be formed. The technique of "least square method" is well known, and a detailed explanation of which is dispensed with. In this form (10), the simulation function is formed, for instance, by initially forming an equation of a suitable order which uses the coordinate position as a variable and then determining a coefficient of each term in the equation on the basis of the coordinate-position data and the optical-characteristic-value data in relation to the individual coordinate positions.

(11) The method according to any one of the above forms (8)-(10), wherein (c) the estimating an unperceivable low-frequency-fluctuation component comprises forming the at least one simulation function whose order is in a range of 1-4.

As explained above, the order of the simulation function influences the degree of approximation of the simulation function and the complexity of the operation for forming the simulation function. In the above-indicated form (11), the simulation function of comparatively lower order is formed. Such simulation function of comparatively lower order assures a relatively high degree of approximation with respect to the comparatively monotonous fluctuation, so that this form (11) permits comparatively easy formation of the function that approximates such a fluctuation. Since the unperceivable low-frequency-fluctuation component is a considerably long-cycle fluctuation as explained above, it may be regarded as a comparatively monotonous fluctuation. Hence, the above-indicated form (11) assures relatively easy formation of the simulation function which simulates the unperceivable low-frequency-fluctuation component.

(12) The method according to any one of the above forms (8)-(11), wherein (c) the estimating an unperceivable low-frequency-fluctuation component comprises forming, as the at least one simulation function, a plurality of simulation functions having mutually different numbers of order.

Since the simulation function is an approximate function, it does not necessarily express an accurate fluctuation. Accordingly, by forming a plurality of simulation functions having mutually different numbers of order, more accurate fluctuation can be estimated. For this reason, the above-indicated form (12) enables accurate estimation of the unperceivable low-frequency-fluctuation component.

(13) The method according to the above form (12), which is a method wherein an unperceivable-low-frequency-component-excluded fluctuation component of the evaluation image in relation to the coordinate positions is identified, the unperceivable-low-frequency-component-excluded fluctuation component being obtained by excluding the unperceivable low-frequency-fluctuation component from the characteristic-value fluctuation, and wherein the evaluation image is evaluated based on the unperceivable-low-frequency-component-excluded fluctuation component, and wherein (c) the estimating an unperceivable low-frequency-fluctuation component comprises estimating a plurality of the unperceivable-low-frequency-component-excluded fluctuation components by the plurality of simulation functions, respectively, and wherein (d) the evaluating the evaluation image comprises evaluating the evaluation image based on the plurality of the unperceivable-low-frequency-component-excluded fluctuation components.

The above-indicated form (13) includes, for instance, a form in which the image evaluation is performed for each of the plurality of simulation functions on the basis of each simulation function and the characteristic-value fluctuation. Such a form leads to improvement of the evaluation accuracy.

(14) The method according to the above form (13), which is a method wherein an evaluation index which is an index in evaluating the evaluation image is identified on the basis of the unperceivable-low-frequency-component-excluded fluctuation component which is based on the characteristic-value fluctuation and the unperceivable low-frequency-fluctuation component, and wherein the evaluation image is evaluated based on the evaluation index, and wherein (d) the evaluating the evaluation image comprises: identifying a plurality of the evaluation indices based on the plurality of the unperceivable-low-frequency-component-excluded fluctuation components; and evaluating the evaluation image based on the plurality of the evaluation indices.

The above-indicated form (14) permits evaluation which takes into account the visual characteristics of the human beings, in evaluating the relatively long-cycle fluctuation of the optical-characteristic values, and improves the convenience, the easiness, the accuracy and so on of the evaluation.

(15) The method according to the above form (14), wherein (d) the evaluating the evaluation image comprises: selecting, based on interrelationship of the plurality of the evaluation indices, one evaluation index to be utilized in evaluating the evaluation image; and evaluating the evaluation image based on the selected one evaluation index.

Briefly, the above-indicated form (15) is a form in which suitable evaluation is selected from a plurality of evaluation respectively based on the plurality of simulation functions, and the selected evaluation is made as final evaluation. Such a form enables the image evaluation to be performed as accurately as possible. As explained above, the evaluation index means a parameter for supporting the image evaluation. "Interrelationship of the plurality of the evaluation indices" in this form (15) is a concept that includes relationship among the individual parameter values, a variation in the parameter values, and the like. The selection of one evaluation index may be carried out in any suitable manner. For instance, there may be selected, as one evaluation index, a largest or a smallest one of the values of the plurality of evaluation indices, a median value among the values of the plurality of evaluation indices, an average value of the values of the plurality of evaluation indices.

(16) The method according to any one of the above forms (1)-(15), wherein (b) the identifying a characteristic-value fluctuation comprises identifying the characteristic-value fluctuation from which an unperceivable high-frequency fluctuation component has been at least excluded.

The unperceivable periodic fluctuation exists not only on the low-frequency side, but also on the high-frequency side. Namely, a certain degree of short-cycle fluctuation of the optical-characteristic values cannot also be perceived by the visual sense of the human beings. Described more specifically, a fluctuation with a cycle of not greater than several tens of microns ($\mu m$), for instance, may be considered to be almost unperceivable. In this form (16) indicated above, the high-frequency fluctuation component has been excluded from the characteristic-value fluctuation identified in (b) the characteristic-value-fluctuation identifying process. Therefore, by considering both of the unperceivable high-frequency component and the unperceivable low-frequency component, the image evaluation which takes into account the visual characteristics of the human beings can be made. In this form (16), operation for excluding the unperceivable high-frequency component is not particularly limited. There may be employed various operation according to mathematical or statistical techniques such as smoothing operation, filter operation, etc., which will be explained. The concept that "an unperceivable high-frequency fluctuation component has been at least excluded" does not mean only complete exclusion of that component. In detail, the concept includes exclusion of the unperceivable high-frequency fluctuation component to an extent sufficient for performing evaluation adapted to the visual characteristics of the human beings.

(17) The method according to the above form (16), wherein (b) the identifying a characteristic-value fluctuation comprises identifying the characteristic-value fluctuation component from which the unperceivable high-frequency fluctuation component has been at least excluded with a result of performing of smoothing operation on the evaluation-image data.

The above-indicated form (17) is a form in which the operation for excluding the high-frequency fluctuation component is concretely limited. "Smoothing operation" in this form (17) is not particularly limited, as long as a substantially unperceivable short-cycle fluctuation component is excluded. There may be suitably employed operation according to an average sampling method, for instance. Since the average sampling method is well known, its detailed explanation is not given. As the smoothing operation according to the average sampling method, the following operation may be performed, for instance: The optical-characteristic values respectively corresponding to a plurality of coordinate positions that are included within a predetermined coordinate region in which a predetermined coordinate position exists are averaged without weighting or with weighting of some kind. Then, there is performed operation of determining the averaged optical-characteristic values as an optical-characteristic value at the above-indicated predetermined coordinate position. This operation is repeatedly performed while moving or changing the coordinate position over the entirety of the evaluation region, whereby the optical-characteristic values are determined for every coordinate position in the entirety of the evaluation region. Since the smoothing operation is comparatively simply performed, the evaluation which is adapted to the visual characteristics of the human beings can be performed in a comparatively simplified manner according to the above-indicated form (17).

(18) The method according to the above form (16), wherein (b) the identifying a characteristic-value fluctuation comprises: identifying a basic characteristic-value fluctuation which is a basis of the characteristic-value fluctuation; forming spatial-frequency characteristic data by performing Fourier transformation on the basic characteristic-value fluctuation; performing filter operation on the spatial-frequency characteristic data for excluding at least the unperceivable high-frequency component; and performing inverse Fourier transformation on the spatial-frequency characteristic data which has been subjected to the filter operation.

The above-indicated form (18) is a form in which the operation for excluding the high-frequency fluctuation component is concretely limited. The three operation described in this form (18) is general in the analysis of the spatial frequency, and its detailed explanation is omitted. In "filter operation", there may be used VTF (Visual Transfer Function) as a filter for excluding the high-frequency component. Because the unperceivable low-frequency-fluctuation component is estimated in (c) the unperceivable-low-frequency-fluctuation-component estimating process, the VTF used in the filter operation according to this form (18) is preferably one which functions only as a high-frequency-cut filter, in other words, one which does not exclude the perceivable fluctuation component on the low-frequency side. The three operation indicated above can be easily performed, so that the evaluation adapted to the visual characteristics of the human beings can be comparatively easily performed according to the this form (18).

(21) A method of evaluating an image forming characteristic of an image forming apparatus, comprising:

obtaining evaluation-image data of an evaluation image which is a basis of evaluation and which is formed by the image forming apparatus whose image forming characteristic is to be evaluated, the evaluation-image data including coordinate-position data indicative of coordinate positions in the evaluation image and optical-characteristic-value data indicative of optical characteristic values at respective coordinate positions;

identifying, based on the evaluation-image data, a characteristic-value fluctuation which is a fluctuation of the optical characteristic values of the evaluation image in relation to the coordinate positions;

estimating, based on the evaluation-image data, an unperceivable low-frequency-fluctuation component which is one component of the characteristic-value fluctuation and which is a component that cannot be perceived due to a considerably low frequency of the fluctuation; and evaluating the image forming characteristic of the image forming apparatus by evaluating the evaluation image based on the characteristic-value fluctuation and the unperceivable low-frequency-fluctuation component.

The above-indicated form (21) is one basic form of the claimable invention which belongs to a category of a method of evaluating an image forming characteristic. Since a detailed explanation of this form overlaps the explanation described above with respect to the image evaluating method according to the basic form, it is omitted here. An image is formed by various kinds of image forming device. Accordingly, in this form (21), by evaluating the formed image, it is possible to easily evaluate the image forming characteristic (e.g., the image forming accuracy and the image forming performance) of the image forming device which forms the image. Namely, for the reasons described above with respect to the image evaluating method according to the above-indicated basic form, this form (21) enables effective evaluation of the image forming characteristic of the image forming device. Accordingly, the method according to this form (21) is a practical method of evaluating the image forming characteristic of the image forming device. It is noted that the method according to this form (21) may be practiced in various forms to which are applied any of the technical features of the above-indicated forms of the image evaluating method.

(31) A device for supporting evaluation of an image, comprising:

an evaluation-image-data obtaining portion which obtains evaluation-image data of an evaluation image to be evaluated, the evaluation-image data including coordinate-position data indicative of coordinate positions in the evaluation image and optical-characteristic-value data indicative of optical characteristic values at respective coordinate positions;

a characteristic-value-fluctuation identifying portion which identifies, based on the evaluation-image data, a characteristic-value fluctuation which is a fluctuation of the optical characteristic values of the evaluation image in relation to the coordinate positions;

an unperceivable-low-frequency-fluctuation-component estimating portion which estimates, based on the evaluation-image data, an unperceivable low-frequency-fluctuation component which is one component of the characteristic-value fluctuation and which is a component that cannot be perceived due to a considerably low frequency of the fluctuation; and an evaluation-index identifying portion which identifies, based on the characteristic-value fluctuation and the unperceivable low-frequency-fluctuation component, an evaluation index which is an index in evaluating the evaluation image.

(41) A device for supporting evaluation of an image forming characteristic of an image forming apparatus, comprising:

an evaluation-image-data obtaining portion which obtains evaluation-image data of an evaluation image that is a basis of evaluation and that is formed by the image forming apparatus whose image forming characteristic is to be evaluated, the evaluation-image data including coordinate-position data indicative of coordinate positions in the evaluation image and optical-characteristic-value data indicative of optical characteristic values at respective coordinate positions;

a characteristic-value-fluctuation identifying portion which identifies, based on the evaluation-image data, a characteristic-value fluctuation which is a fluctuation of the optical characteristic values of the evaluation image in relation to the coordinate positions;

an unperceivable-low-frequency-fluctuation-component estimating portion which estimates, based on the evaluation-image data, an unperceivable low-frequency-fluctuation component which is one component of the characteristic-value fluctuation and which is a component that cannot be perceived due to a considerably low frequency of the fluctuation; and an evaluation-index identifying portion which identifies, based on the characteristic-value fluctuation and the unperceivable low-frequency-fluctuation component, an evaluation index with respect to the evaluation image which is an index in evaluating the image forming characteristic of the image forming apparatus.

The above-indicated two forms (31) and (41) are basic forms of the claimable invention which belong to respective categories different from those described above. In other words, the form (31) relates to an evaluation supporting device which implements a part of the image evaluating method described above and the form (41) relates to an evaluation supporting device which implements a part of the image-forming-characteristic evaluating method described above. Each of the two evaluation supporting devices according to the forms (31) and (41) may be constituted principally by a computer. Because a detailed explanation of each evaluation supporting device overlaps the explanation described above with respect to the image evaluating method according to the basic form, it is not given here. It is noted that each of evaluation supporting devices according to the forms (31) and (41) may be arranged in various forms to which are applied any of the technical features of the above-indicated forms of the image evaluating method.

(51) A program executed by a computer for evaluating an image, comprising:

an evaluation-image-data obtaining step of obtaining evaluation-image data of an evaluation image to be evaluated, the evaluation-image data including coordinate-position data indicative of coordinate positions in the evaluation image and optical-characteristic-value data indicative of optical characteristic values at respective coordinate positions;

a characteristic-value-fluctuation identifying step of identifying, based on the evaluation-image data, a characteristic-value fluctuation which is a fluctuation of the optical characteristic values of the evaluation image in relation to the coordinate positions;

an unperceivable-low-frequency-fluctuation-component estimating step of estimating, based on the evaluation-image data, an unperceivable low-frequency-fluctuation component which is one component of the characteristic-value fluctuation and which is a component that cannot be perceived due to a considerably low frequency of the fluctuation; and an evaluation-index identifying step of identifying, based on the characteristic-value fluctuation and the unperceivable low-frequency-fluctuation component, an evaluation index which is an index in evaluating the evaluation image.

(61) A program executed by a computer for evaluating an image forming characteristic of an image forming apparatus, comprising:

an evaluation-image-data obtaining step of obtaining evaluation-image data of an evaluation image which is a basis of evaluation and which is formed by the image forming apparatus whose image forming characteristic is to be evaluated, the evaluation-image data including coordinate-position data indicative of coordinate positions in the evaluation image and optical-characteristic-value data indicative of optical characteristic values at respective coordinate positions;

a characteristic-value-fluctuation identifying step of identifying, based on the evaluation-image data, a characteristic-value fluctuation which is a fluctuation of the optical characteristic values of the evaluation image in relation to the coordinate positions;

an unperceivable-low-frequency-fluctuation-component estimating step of estimating, based on the evaluation-image data, an unperceivable low-frequency-fluctuation component which is one component of the characteristic-value fluctuation and which is a component that cannot be perceived due to a considerably low frequency of the fluctuation; and an evaluation-index identifying step of identifying, based on the characteristic-value fluctuation and the unperceivable low-frequency-fluctuation component, an evaluation index which is related to the evaluation image and which is an index in evaluating the image forming characteristic of the image forming apparatus.

(71) A recording medium in which the program according to the above form (51) or (61) is readably recorded.

The above-indicated three forms (51), (61), and (71) are basic forms of the claimable invention which belong to respective categories different from those described above. Where each of the evaluation supporting devices according to the above forms (31), (41) is constituted principally by a computer, for instance, it is supposed that the programs according to the forms (51), (61) are those for operating the devices and the recording medium according to the form (71) is one on which each program is recorded. Because a detailed explanation of each of the forms (51), (61), and (71) overlaps the explanation described above with respect to the image evaluating method according to the basic form, it is not given here. It is noted that the evaluation supporting programs according to the forms (51) and (61) and the recording medium according to the form (71) may be arranged in various forms to which are applied any of the technical features of the above-indicated forms of the image evaluating method.

(81) An image processing apparatus comprising: an image forming device which forms an image on an image-formation medium; image-information reading device which can read information of the image formed on the image-formation medium; and a control device which controls the image processing apparatus, wherein the control device includes: (A) an evaluation-image-forming control portion which controls the image forming device to form, on the image-formation medium, an evaluation image for evaluating an image forming characteristic of the image forming device; (B) an evaluation-image-data-obtaining control portion which controls the image-information reading device to read information of the evaluation image and obtains, based on the information, evaluation-image data of the evaluation image which includes coordinate position data indicative of coordinate positions in the evaluation image and optical-characteristic-value data indicative of optical characteristic values at respective coordinate positions; (C) a characteristic-value-fluctuation identifying portion which identifies, based on the evaluation-image data, a characteristic-value fluctuation which is a fluctuation of the optical characteristic values of the evaluation image in relation to the coordinate positions; (D) an unperceivable-low-frequency-fluctuation-component estimating portion which estimates, based on the evaluation-image data, an unperceivable low-frequency-fluctuation component which is one component of the characteristic-value fluctuation and which is a component that cannot be perceived due to a considerably low frequency of the fluctuation; and (E) an evaluation-index identifying portion which identifies, based on the characteristic-value fluctuation and the unperceivable low-frequency-fluctuation component, an evaluation index which is related to the evaluation image and which is an index in evaluating the image forming characteristic of the image forming device, and wherein the control device has a function of supporting evaluation of the image forming characteristic of the image forming device.

The above-indicated form (81) is one basic form of the claimable invention which belongs to a category of an image processing apparatus in which an image forming device and image-information reading deice is combined, such as a multi function printer equipped with a scanning device as the image-information reading device and a printing device as the image forming device. In such an image processing apparatus, a control unit or the like which is principally constituted by a computer that controls the printing device, the scanning device, etc., functions as a control device. The above-indicated form (81) realizes the image processing apparatus having a function of supporting evaluation of the image forming characteristic of the image forming device owned by itself. Such an image processing apparatus assures high utility. Because a detailed explanation of the function of supporting the evaluation according to this form (81) overlaps the explanation described above with respect to the image evaluating method according to the basic form, it is not given here. It is noted that the image processing apparatus according to this form (81) may be arranged in various forms in which any of the technical features of the above-indicated forms of the image evaluating method is applied to the control device.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which.

DETAILED DESCRIPTION OF THE PREFERRED EMBODIMENT

There will be described one embodiment and modified embodiments of the present invention by reference to the accompanying drawings. It is to be understood that the present invention is not limited to the following embodiments, and may be otherwise embodied with various changes and alternations, such as those described in the foregoing FORMS OF THE INVENTION, which may occur to those skilled in the art. It is noted that the following embodiments relate to a multiple-function-type printer as an image processing apparatus.

<Outline of Hardware Structure of Printer>

Figure 1:
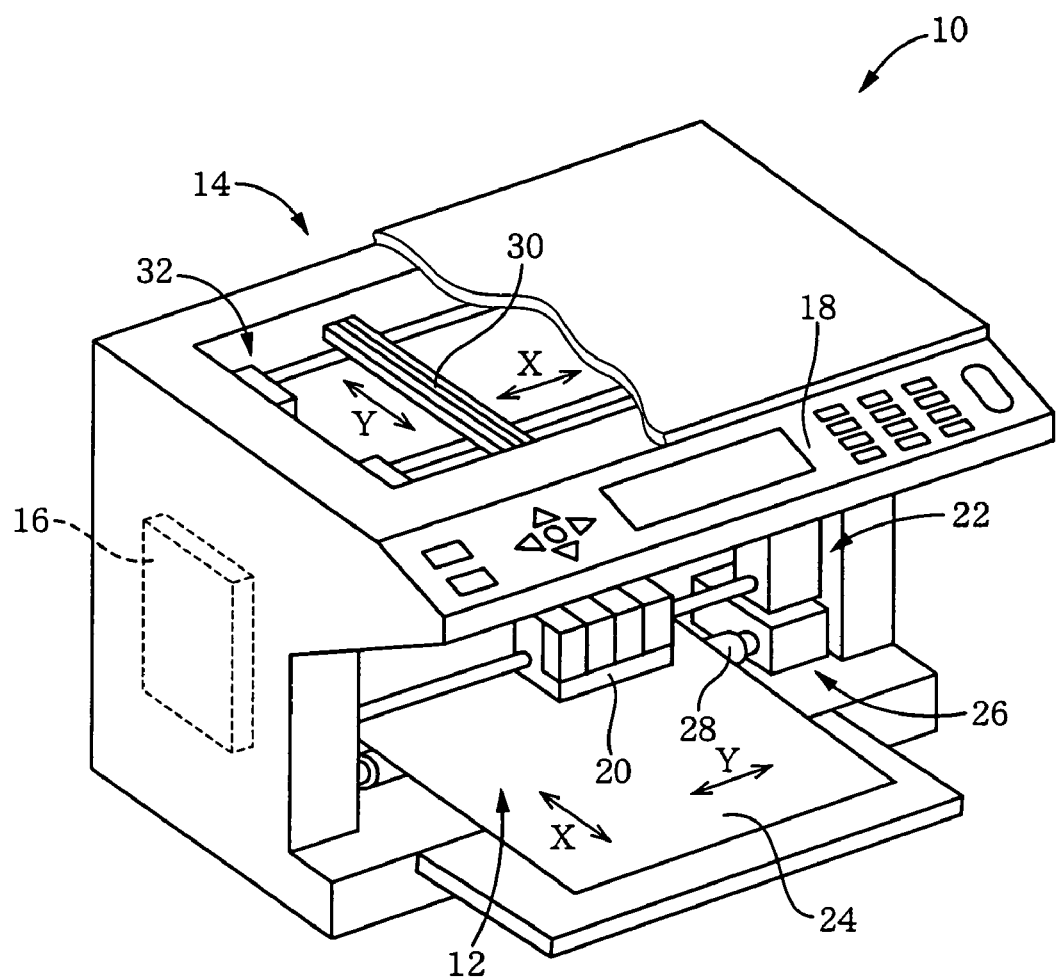
FIG. 1 is a perspective view showing a multi-function-type printer.

Referring first to the perspective view of FIG. 1, there is shown a multi-function-type printer 10. The printer 10 is a multi-functional machine equipped with an image scanner. From the viewpoint of a hardware structure, the printer 10 is constituted by including a printing device 12 as an image forming device, a scanning device 14 as an image reading device, a control device 16 as a control device, and an operating panel 18.

The printing device 12 is has a structure of a general ink-jet type. The printing device 12 uses four inks each as a coloring material, namely, black ink (b) and three color inks, i.e., cyan (c), magenta (m), and yellow (y). The four inks are accommodated in respective ink containers. The ink containers are installed on a printing head 20. (Hereinafter, the printing head 20 may be simply referred to as "head 20".) The head 20 includes four ink ejecting units respectively having a plurality of nozzles for ejecting the respective inks. The head 20 is carried by a head carrier 22. The head 20 is moved by the head carrier 22 in a transverse direction as seen in FIG. 1, namely, in "Y"-direction indicated in FIG. 1. A printing sheet 24 (hereinafter may be referred to as "sheet 24") is fed from the back side of the printer 10 by a sheet feeder 26 (hereinafter may be referred to as "feeder 26"), in detail, by rotation of a feeding roller 28 of the feeder 26, in a sheet feeding direction, namely, in "X"-direction indicated in FIG. 1. The sheet 24 is an image-formation medium. The sheet 24 is intermittently fed by the feeder 26 in the X-direction while the head 20 is reciprocably moved by the head carrier 22 in the Y-direction, so that an image is printed on the entire surface of the sheet 24. It is noted that the printing device 12 is capable of printing an image on a printing sheet having a size up to A4 size.

The scanning device 14 is of a general flat-bed type, and includes a scanning head 30 which is moved by a scanning head carrier 32 in "X"-direction. In the scanning head 30, CCD elements as light-receiving elements and LED elements which function as a light source are arranged on respective straight lines in "Y"-direction. The scanning head 30 is moved by the scanning head carrier 32 in one direction, to thereby incorporate information of an image formed on a surface of a reading object which is placed on the flat bed. It is noted that the scanning device 14 is capable of scanning an image formed on the reading object having a size of up to A4 size.

The control unit 16 is constituted principally by a computer including a CPU, a RAM, a ROM, an image-data processing unit, an input/output interface, bus lines connecting those components, etc. The control unit 16 has a function of controlling operation of the printing device 12, the scanning device, etc.

<Image Forming Characteristic of Printing Device>

The printing device 12 has a construction as described above, and the image forming characteristic of the printing device 12, namely, the quality of an image to be printed by the printing deice 12, the image forming capability of the printing device 12, etc., is influenced by conditions and status of the components which constitute the printing device 12. For example, the ink is ejected from the nozzles and attached to the surface of the sheet 24 in the form of dots. In this instance, the size of each dot may be varied due to a variation in the amount of the ink to be ejected. The variation in the size of the dots causes a variation in the concentration of the image, a fluctuation in the color of the image, and so on. Further, since the image is printed while the head 20 is moved by the head carrier 22 and the sheet 24 is fed by the feeder 26, a change in the moving speed of the head 20 by the head carrier 22 and a change in the feeding speed of the sheet 24 by the feeder 26 also cause the variation in the concentration of the image, the fluctuation in the color of the image, and so on. The head carrier 22 and the feeder 26 are constituted by a roller mechanism having the feeding roller 28, a gear mechanism, and the like. Accordingly, deterioration of those mechanisms due to wear, for instance, and improper adjustment of those mechanisms lead to periodical changes in the moving speed of the head 20 and the feeding speed of the sheet 24. Those periodic changes cause a periodic variation in the concentration of the printed image, a periodic fluctuation in the color of the printed image, and so on, in other words, a periodic fluctuation in optical characteristic values in relation to positions in the printed image. This periodic fluctuation is perceived as image irregularity or unevenness to a person who views the image. The cycle of the periodic fluctuation caused as described above is relatively long, e.g., in a range from about several millimeters to several tens of millimeters. Accordingly, such a periodic fluctuation is a relatively low-frequency fluctuation.

The image to be printed by the printing device 12 suffers from an unperceivable, low-frequency fluctuation in the optical characteristic values, due to the construction of the printing device 12, or the like. For instance, there is generated a fluctuation in the optical characteristic values having a considerably long cycle, due to an inevitable slip of the sheet 24 relative to the feeding roller 28, a warpage of a guide member of the head carrier 22 for guiding the head 20, etc. This unperceivable, low-frequency fluctuation component has a long cycle. More specifically described, the length of the A4-size sheet (the dimension in the longitudinal direction of the A4-size sheet) corresponds to a half cycle, one cycle, or two cycles, for instance, in the unperceivable low-frequency fluctuation component.

While the image forming characteristic of the printing device 12 can be evaluated in terms of various evaluation items, the image forming characteristic is evaluated, in the present embodiment, mainly in terms of the image irregularity, i.e., the relatively long-cycle fluctuation in the optical characteristic values in the printed image. Namely, in the present embodiment, the image forming characteristic of the printing device 12 is evaluated by focusing on the fluctuation in the optical characteristic values which arises from the head carrier 22 and the feeder 26 described above and employing, as the evaluation item, a degree of the fluctuation such as an amplitude of the fluctuation. In evaluating the image forming characteristic of the printing device 12, the evaluation is arranged to be performed so as to be adapted for the visual characteristics of the human beings. While referring to this, the evaluation of the image forming characteristic will be hereinafter explained.

<Functional Structure of Control Unit>

Figure 2:
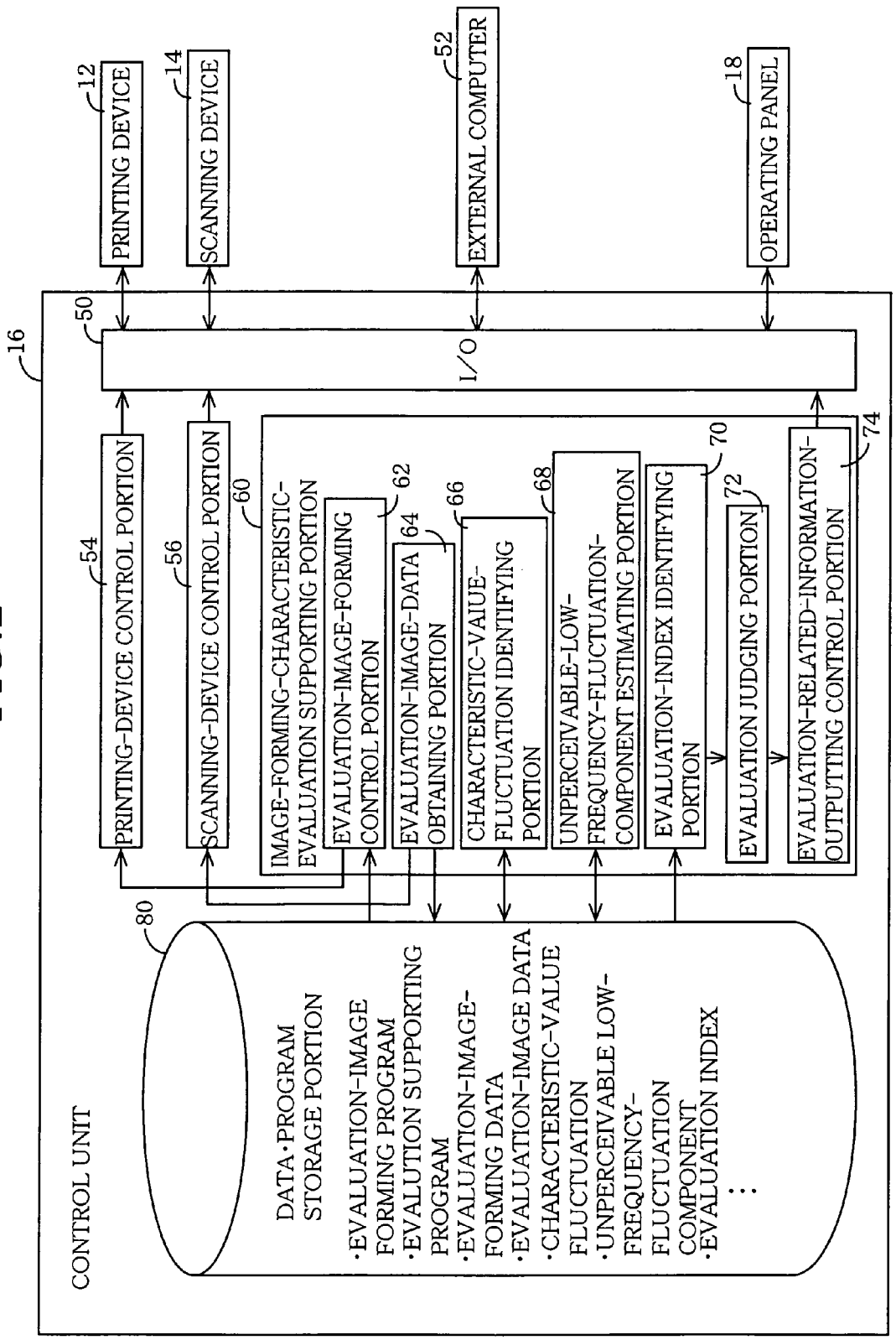
FIG. 2 is a block diagram of a control unit of the printer of FIG. 1.

The printer 10 of the present embodiment has a function of supporting the evaluation of the image forming characteristic of the printing device 12 described above. Operation relating to the support of the evaluation is mainly data processing by a computer. In the present printer 10, the control unit 16 executes the data processing. The functional structure of the control unit 16 will be explained by referring to the schematic block diagram of FIG. 2 principally showing functional structure of the control unit 16 related to the evaluation supporting function.

The control unit 16 includes an input/output interface (I/O) 50. The scanning device 14, the printing device 12, the operating panel 18, and an external computer 52 are connected to ports of the I/O 50. The control unit 16 includes a printing-device control portion 54 and a scanning-device control portion 56 which respectively control operation of the printing device 12 and operation of the scanning device 14. The present printer 10 is arranged to perform ordinary printing operation and image-data reading operation based on commands of the external computer 52 and information inputted from the external computer 52. The printing-device control portion 54 and the scanning-device control portion 56 are arranged to respectively control the printing device 12 and the scanning device 14, in relation to such ordinary operation.

The control unit 16 includes an image-forming-characteristic-evaluation supporting portion 60 which performs a series of operation for supporting the evaluation of the image forming characteristic of the printing device 12 and which corresponds to a portion of the control unit 16 having a function of supporting evaluation of the image forming characteristic of the image forming device in the form of the printing device 12. The image-forming-characteristic-evaluation supporting portion 60 includes, as portions for performing each of the series of operation, an evaluation-image-forming control portion 62, an evaluation-image-data obtaining portion 64, a characteristic-value-fluctuation identifying portion 66, an unperceivable-low-frequency-fluctuation-component estimating potion 68, an evaluation-index identifying portion 70, an evaluation judging portion 72, and an evaluation-related-information-outputting control portion 74.

The function of each of the functional portions of the image-forming-characteristic-evaluation supporting portion 60 will be briefly explained. The evaluation-image-forming control portion 62 controls the printing device 12 via the printing-device control portion 54 and thereby performs operation of allowing the printing device 12 to print, based on predetermined evaluation-image forming data, an evaluation image to be utilized for evaluation of the image forming characteristic of the printing device 12. The evaluation-image-data obtaining portion 64 controls the scanning device 14 via the scanning-device control portion 56 to read information of the evaluation image and thereby performs operation of obtaining evaluation-image data that will be explained in greater detail. The characteristic-value-fluctuation identifying portion 66 performs operation of identifying, on the basis of the obtained evaluation-image data, a characteristic-value fluctuation with respect to the evaluation image that will be described. The unperceivable-low-frequency-fluctuation-component estimating portion 70 performs operation of estimating an unperceivable low-frequency-fluctuation component that will be explained in greater detail, on the basis of the characteristic-value fluctuation identified based on the evaluation-image data. The evaluation-index identifying portion 70 performs operation of identifying an evaluation index that will be explained in greater detail, on the basis of the characteristic-value fluctuation and the unperceivable low-frequency-fluctuation component. The evaluation judging portion 72 performs operation of judging whether the image forming characteristic of the printing device 12 is good or not, on the basis of the identified evaluation index. The evaluation-related-information-outputting control portion 74 performs operation of outputting the evaluation index and the result of the judgment, namely, operation of indicating them on the operating panel 18.

The above-indicated series of operation is carried out by execution of the two control programs by the control unit 16, i.e., an evaluation-image forming program and an evaluation supporting program, which will be explained in greater detail. These two programs are stored in a data•program storage portion 80. In the data•program storage portion 80, there are stored the above-described evaluation-image-forming data, evaluation-image data, characteristic-value fluctuation, unperceivable low-frequency-fluctuation component, evaluation index, etc. In addition, there are stored, in the data•program storage portion 80, various functions, various values as parameters, various threshold values, etc., to be used in the series of operation described above. The data-program storage portion 80 is one kind of a recording medium and constituted by the ROM and the RAM.

<Operation of Supporting Evaluation of Image Forming Characteristic>

Figure 3:
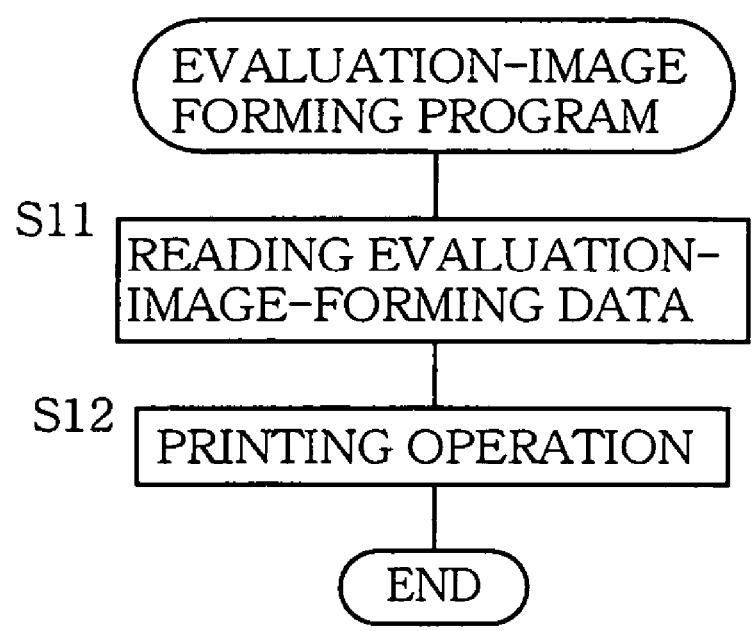
FIG. 3 is a flow chart showing an evaluation-image forming program executed for supporting evaluation of the image forming characteristic of a printing device.
Figure 4:
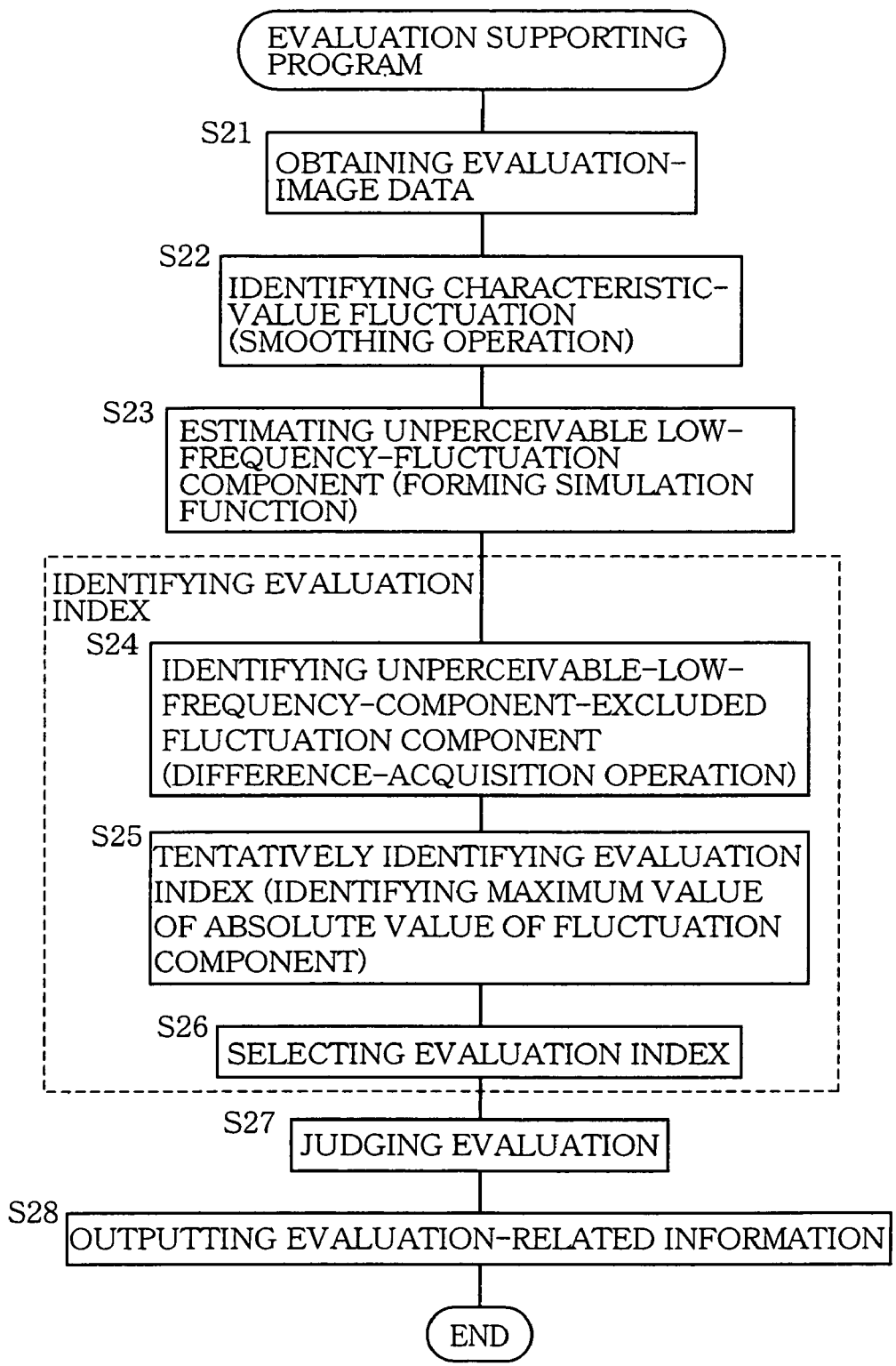
FIG. 4 is a flow chart showing an evaluation supporting program executed for supporting evaluation of the image forming characteristic of the printing device.

As described above, the series of operation of supporting the evaluation of the image forming characteristic (hereinafter may be referred to as "supporting operation") is carried out by execution of the evaluation-image forming program indicated by a flow chart of FIG. 3 and the evaluation supporting program indicated by a flow chart of FIG. 4, which programs are executed by the control unit 16. Hereinafter, the method of supporting the evaluation of the image forming characteristic by the present control unit 16 will be explained by explaining in detail contents of each of steps constituting the respective programs, that is, contents of the process performed by execution of each step, while referring to the flow charts.

[A] Evaluation-Image Forming Process
(Evaluation-Image Forming Step)

The operation in the evaluation-image forming process is performed by the evaluation-image-forming control portion 62 and by execution of the evaluation-image forming program. After a suitable A4-size sheet 24 for evaluation has been set on the printing device 12, predetermined manipulation on the operating panel 18 initiates execution of the evaluation-image forming program.

The evaluation-image forming program consists of two steps. Described more specifically, Step S11 (hereinafter "Step" is omitted where appropriate) is implemented to read the evaluation-image forming data stored in the data•program storage portion 80. The evaluation-image forming data is data related to the color of ink to be attached and the position on the sheet 24 to which the ink is attached. In the present supporting operation, a uniform, monocolor image with black, in detail, a solid image with pale gray is printed, as the evaluation image, on the substantially entire surface of the sheet 24. Accordingly, the evaluation-image-forming data is for allowing such an evaluation image to be printed. Described more specifically, where the tone level of deep black color is 0 and the tone level of pure white color is 255, the tone level of the pale gray color of the evaluation image to be printed is 224. Further, by the evaluation-image-forming data, the evaluation image is printed such that dots are formed at only a predetermined proportion of dot positions that are uniformly dispersed or distributed, among a multiplicity of dot positions which are arranged in the densest manner that can be achieved by the printing device 12.

After S11, S12 is implemented to give, to the printing-device control portion 54, a command to print a predetermined evaluation image based on the evaluation-image forming data read in S11. The printing-device control portion 54 controls the printing device 12, on the basis of the command, to print the predetermined evaluation image. The evaluation-image forming program is completed after execution of S12. By execution of the evaluation-image forming program, the predetermined evaluation image is formed on the sheet 24.

[B] Evaluation-Image-Data Obtaining Process
(Evaluation-Image-Data Obtaining Step)

This evaluation-image-data obtaining process and the following processes described below are performed by execution of the evaluation supporting program. The sheet 24 on which the evaluation image has been printed as described above is set on the scanning device 14, and predetermined manipulation on the operating panel 18 initiates execution of the evaluation supporting program.

The evaluation-image-data obtaining process is performed by the evaluation-image-data obtaining portion 64 and by execution of S21 of the evaluation supporting program. Initially, in S21, the scanning device 14 reads information of the evaluation image over its entire region. The image information read by the scanning device 14 is luminance data for every readable physical picture element. In the present embodiment, a plurality of the physical picture elements (e.g., those including four, nine, sixteen) which are adjacent to one another in a two-dimensional manner such that a plurality of dots of the evaluation image are included are set as one theoretical picture element. A sum of the luminance of the physical picture elements that constitutes the theoretical picture element is regarded as the luminance data for every theoretical picture element. The luminance of the physical picture elements is one kind of the optical characteristic values. Each theoretical picture element is allocated to a position on a two-dimensional rectangular coordinate system (X, Y) defined by two mutually perpendicular axes which respectively extend in the above-indicated X direction and Y direction. The image information is read as a set of the luminance data corresponding to each coordinate position of the evaluation image. Subsequently, the luminance at each coordinate position is converted to lightness L* of the L*a*b* colorimetric system. The lightness L* is one kind of the optical characteristic values and hereinafter may be simply referred to as "L". The lightness L at each coordinate position obtained by the conversion described above is average lightness at each of regions of the theoretical picture elements in which the plurality of dots are included. The image data including the coordinate-position data indicative of the coordinate positions in the evaluation image and the luminance (L) data at individual coordinate positions is obtained as the evaluation-image data. The thus obtained evaluation-image data is stored in the data•program storage portion 80.

Figure 5:
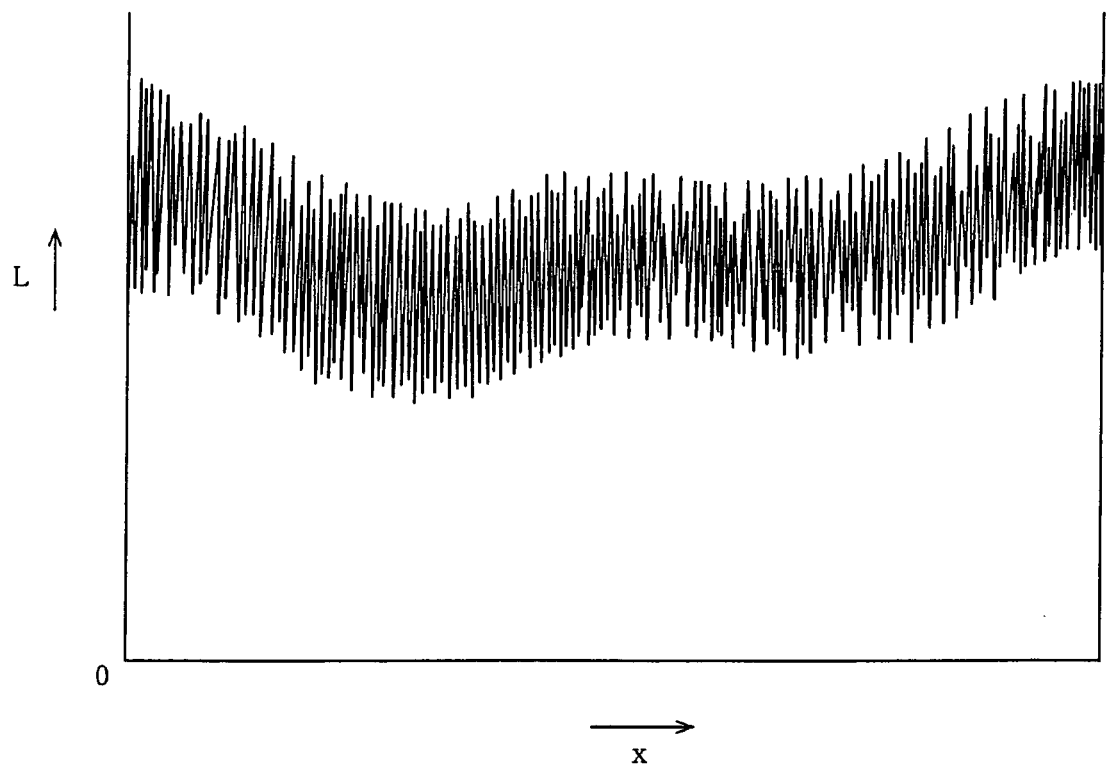
FIG. 5 is a chart schematically indicating evaluation-image data obtained in the process of obtaining evaluation-image data.

FIG. 5 shows a chart schematically indicating the evaluation-image data obtained by the above-indicated operation. For easier understanding of a fluctuation of the lightness L, this chart shows the lightness L corresponding to the coordinate positions in the X direction (the longitudinal direction of the A4-size sheet) at a certain Y-coordinate position. It is noted that the full length of the transverse axis in this chart is substantially equal to the length (the longitudinal dimension) of the A4-size sheet and the chart indicates the fluctuation of the lightness L of the entirety of the evaluation image. As is clearly understood from the chart, the fluctuation of the lightness L corresponding to the change of the X-coordinate position largely contains a high-frequency fluctuation component, in detail, an unperceivable high-frequency fluctuation component. It is noted that the fluctuation of the lightness L contains the high-frequency component at mutually different Y-coordinate positions. It is further noted that the high-frequency component is similarly contained in the fluctuation of the lightness L corresponding to a change of the Y-coordinate position where the X-coordinate position is fixed.

[C] Characteristic-Value-Fluctuation Identifying Process (Characteristic-Value-Fluctuation Identifying Step)

The characteristic-value-fluctuation identifying process is performed by the characteristic-value-fluctuation identifying portion 66 and by execution of S22. In this process, a smoothing operation is performed, for easier evaluation, on the stored evaluation-image data for excluding the above-described high-frequency fluctuation component, in detail, for at least excluding the unperceivable high-frequency fluctuation component, to thereby identify a lightness fluctuation which is a fluctuation of the lightness in relation to the coordinate positions. The smoothing operation is performed according to an average sampling method. In this smoothing operation, one dimensional operation for obtaining the fluctuation in a specific direction is simultaneously performed.

Figure 6:
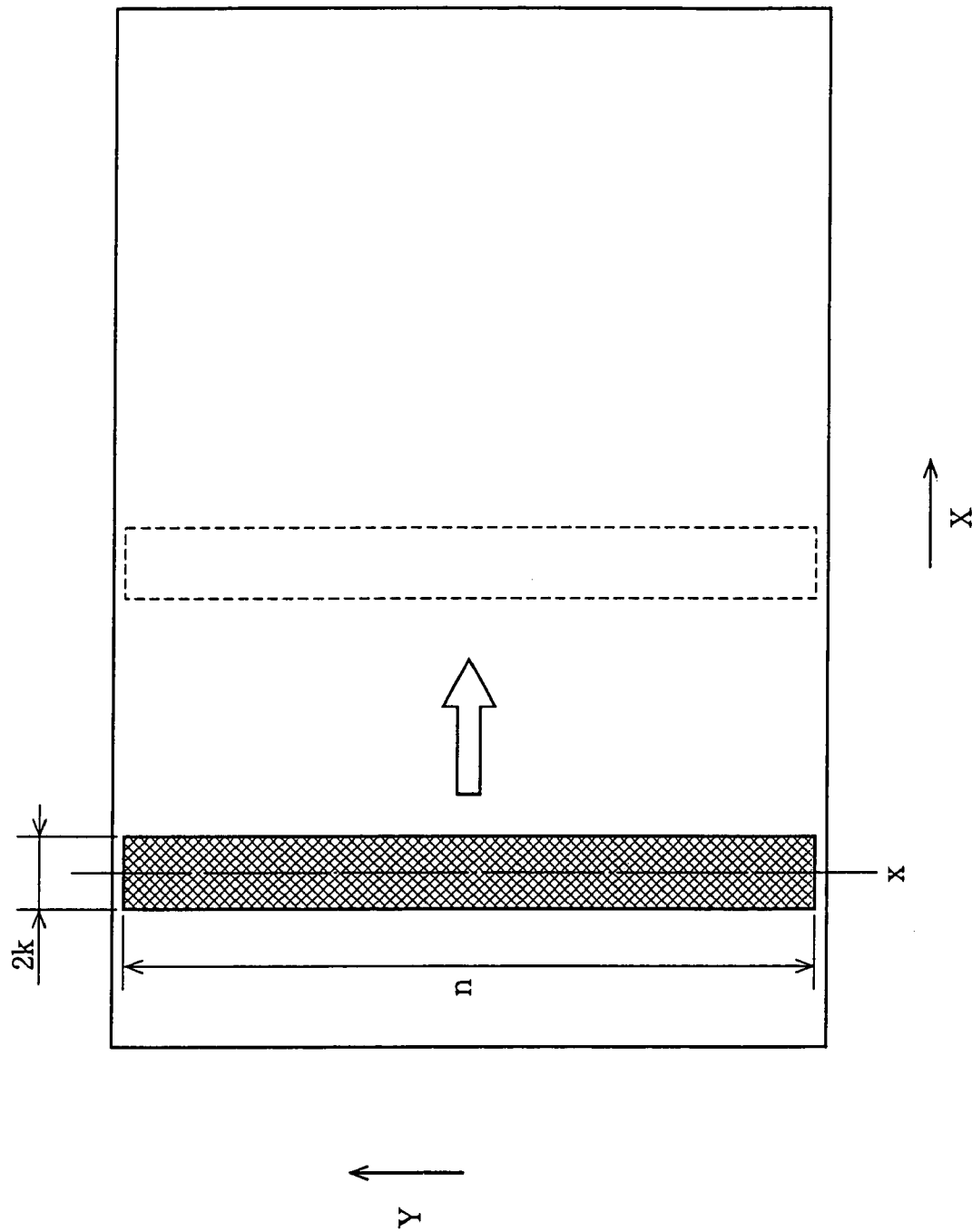
FIG. 6 is a schematic view for explaining smoothing operation carried out in the process of identifying a characteristic-value fluctuation.

The smoothing operation is schematically shown in FIG. 6. In the operation shown in FIG. 6, the evaluation-image data is subjected to the one-dimensional operation in the X direction as the specific direction. Initially, there is set a reference line in the entire region of the evaluation image whose X-coordinate position is "x" and which is parallel to the Y axis. Further, there is set an operation area (indicated by a shaded area in FIG. 6) whose widthwise centerline coincides with the reference line, which has a width corresponding to 2k pixels (i.e., corresponding to the theoretical picture elements of 2k), and which has a dimension as measured in the Y direction that is equal to the width of the evaluation image and that corresponds to n pixels [i.e., corresponds to the theoretical picture elements of n). After all picture elements in the operation area, i.e., the values of the lightness L at all coordinate positions have been subjected to predetermined weighting, there is obtained an average value of the weighted lightness values, and the average value is identified as lightness L at the coordinate position "x". This operation is performed over the entire region of the evaluation image along the X direction while moving the operation region pixel by pixel in the X direction, thereby identifying the fluctuation of the lightness L in relation to the coordinate position x.

The data values of the lightness L in relation to the coordinate position x in the X direction obtained as a result of the smoothing operation, namely, the characteristic-value fluctuation I(x) identified in this process is represented by the following formula (1):

$$I(x) = \sum_{i=-k}^{k} \sum_{j=0}^{n} \{Mat(i, j) * L(x+i, j)\} \tag{1}$$

In the above formula (1), "Mat(i, j)" is a coefficient matrix for smoothing and may be arbitrarily determined depending upon the purpose of the evaluation, the items of the evaluation, and so on. In some cases, it may be possible to employ a matrix without weighting. While, in the present embodiment, the half-width value k of the operation area in the X direction corresponds to about 5 pixels, the half-width value may be arbitrarily determined depending upon the evaluation purpose, the evaluation items, and so on.

Figure 7:
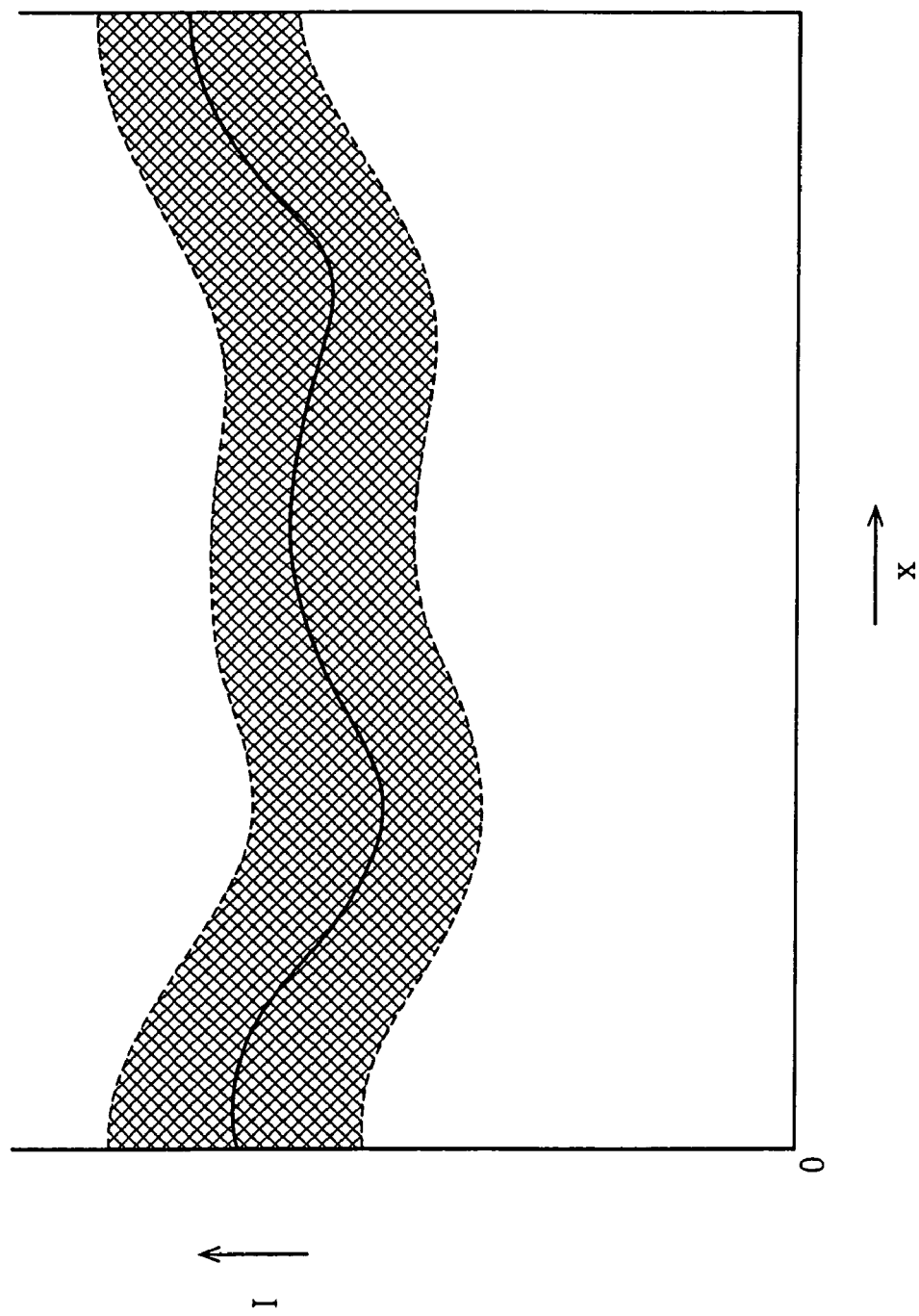
FIG. 7 is a chart schematically indicating a characteristic-value fluctuation which is identified in the process of identifying a characteristic-value fluctuation.

FIG. 7 is a chart schematically showing the lightness fluctuation obtained by the above-indicated smoothing operation. It is noted that the shaded area in this chart indicates portions of the evaluation-image data (FIG. 5) in which the lightness values exist. In the lightness fluctuation shown in the chart of FIG. 7, the high-frequency fluctuation component, in detail, the unperceivable high-frequency component has been at least excluded or removed, so that the lightness fluctuation is comparatively smooth or gradual. Further, it is recognized that the evaluation image suffers from image irregularity of some kind. While it will be explained later, the lightness fluctuation shown in the chart contains: a fluctuation component having a cycle corresponding to about several fractions of the longitudinal dimension of the A4 size; and a considerably long-cycle fluctuation component in which the longitudinal dimension of the A4 size corresponds to about a half cycle or about one cycle.

In the explanation of the smoothing operation indicated above, only the lightness fluctuation in the X direction has been described. In the present process of identifying the characteristic-value fluctuation, the lightness fluctuation in the Y direction is also identified by operation similar to that explained above. The lightness fluctuation identified in the present process is stored in the data•program storage portion 80 as characteristic-value-fluctuation data including the coordinate-position data and the lightness data corresponding to individual coordinate positions. In the characteristic-value-fluctuation identifying process, where the lightness fluctuation in the X direction is identified, for instance, the smoothing operation is performed by setting the operation area whose dimension as measured in the Y direction is equal to the width of the evaluation image. It may be possible that the operation area is limited to a part of the evaluation image and the lightness fluctuation in a specific direction is identified in one area of the evaluation image having a certain width.

[D]
Unperceivable-Low-Frequency-Fluctuation-Component Estimating Process
(Unperceivable-Low-Frequency-Fluctuation-Component Estimating Step)

The following unperceivable-low-frequency-fluctuation-component estimating process is performed by the unperceivable low-frequency-fluctuation-component estimating portion 68 and by execution of S23. In this process, the unperceivable low-frequency fluctuation component of the lightness is estimated. More specifically, in this process, there is formed, on the basis of the stored characteristic-value-fluctuation data, a simulation function which simulates the unperceivable low-frequency-fluctuation component, in other words, a function which approximates the unperceivable low-frequency-fluctuation component that is considered to be accurate. The simulation function is formed for each of the X direction and the Y direction as a function with one unknown which uses the coordinate position as a variable or parameter. In the present estimating process, there are formed four simulation functions having mutually different numbers of order, in detail, four simulation functions from first order to fourth order.

The four simulation functions formed for the X direction are indicated as follows:

$$I_1'(x) = a_1 * x + b_1$$

$$I_2'(x) = a_2 * x^2 + b_2 * x + c_2$$

$$I_3'(x) = a_3 * x^3 + b_3 * x^2 + c_3 * x + d_3$$

$$I_4'(x) = a_4 * x^4 + b_4 * x^3 + c_4 * x^2 + d_4 * x + e_4$$

The formation of the simulation functions is performed such that the coefficient of each term in each simulation function is determined according to a least square method, on the basis of the data of the lightness fluctuation identified in the characteristic-value-fluctuation identifying process. In the present process of estimating the unperceivable low-frequency-fluctuation component, the unperceivable low-frequency-fluctuation components $I_1'(x) \sim I_4'(x)$ in relation to the coordinate positions are estimated in the form of those respective four simulation functions. As for the Y direction, the unperceivable low-frequency-fluctuation components are similarly estimated in the form of four simulation functions. The simulation functions formed for the X direction and the Y direction are stored in the data•program storage portion 80.

Figure 8:
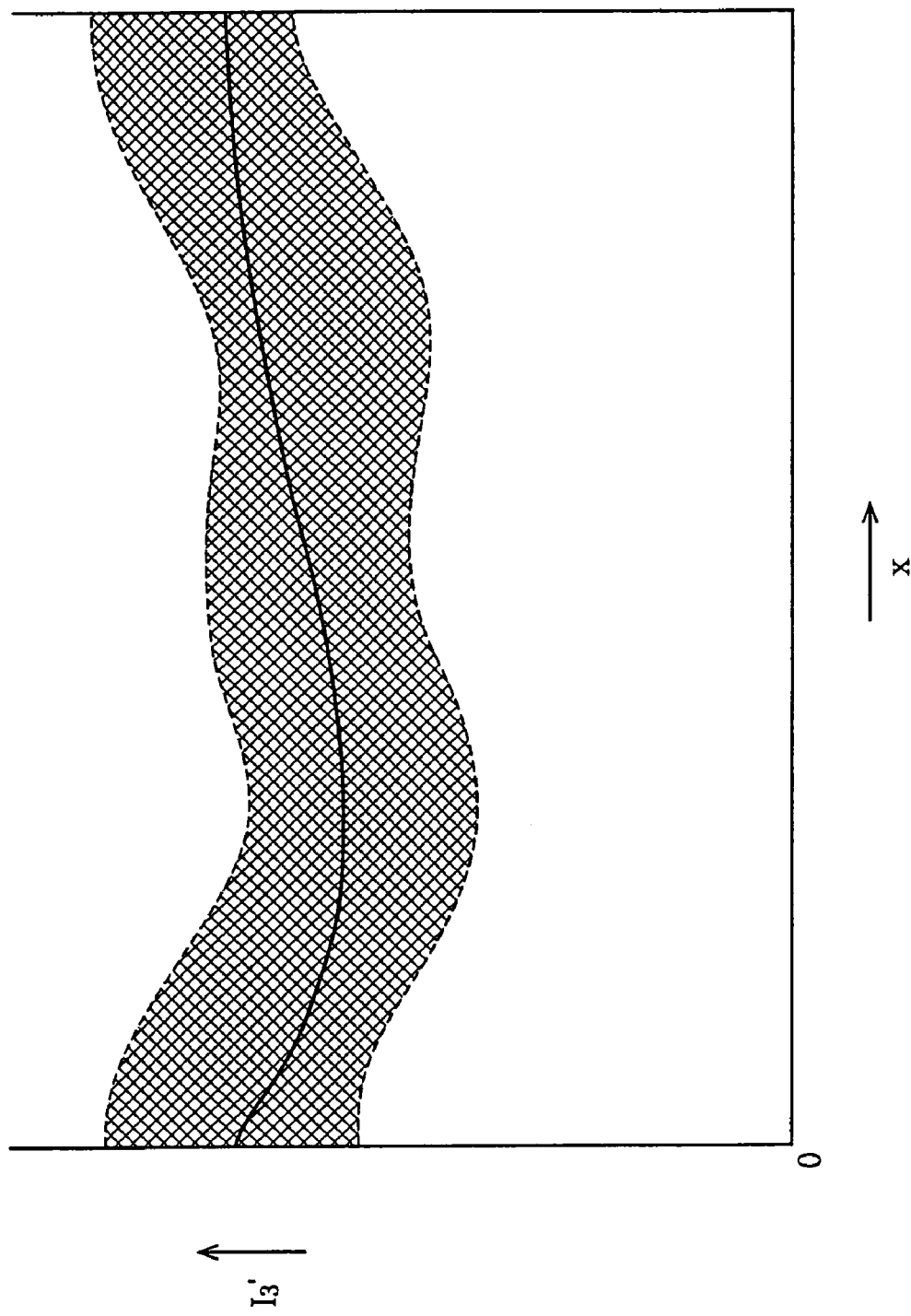
FIG. 8 is a chart schematically indicating an unperceivable low-frequency-fluctuation component which is estimated in the form of a simulation function in the process of estimating an unperceivable low-frequency-fluctuation component.

The chart of FIG. 8 shows, as a representative of the four simulation functions, the third-order simulation function $I_3'(x)$, in detail, the unperceivable low-frequency-fluctuation component estimated in the form of the simulation function. The shaded area in the chart of FIG. 8 indicates portions of the evaluation-image data (FIG. 5) in which the lightness values exist. It is recognized from the chart that the unperceivable low-frequency-fluctuation component is a low-frequency fluctuation in which the longitudinal dimension of the A4 size corresponds to about a half cycle or about one cycle. Accordingly, the simulation function appropriately simulates the unperceivable low-frequency-fluctuation component.

[E] Evaluation-Index Identifying Process
(Evaluation-Index Identifying Step)

The following evaluation-index identifying process is performed by the evaluation-index identifying portion 70 and by execution of S24 through S26 in order. In other words, the evaluation-index identifying process consists of three sub-processes. The contents of the sub-processes by execution of S24, S25, and S26, respectively, are explained below.

(i) First Sub-Process of Identifying Unperceivable-Low-Frequency-Component-Excluded Fluctuation Component (First Sub-Step of Identifying Unperceivable-Low-Frequency-Component-Excluded Fluctuation Component)

In the evaluation-index identifying process, the first sub-process of identifying an unperceivable-low-frequency-component-excluded fluctuation component is initially performed by execution of S24. Described in detail, as for the X direction, each of the stored unperceivable low-frequency-fluctuation components $I_1'(x) \sim I_4'(x)$ is subtracted from the stored characteristic-value fluctuation I(x) according to the following formulas, thereby identifying the unperceivable-low-frequency-component-excluded fluctuation components $I_1''(x) \sim I_4''(x)$ in relation to the coordinate position x. Namely, the operation in the first sub-process is difference-acquisition operation.

$$I_1''(x) = I(x) - I_1'(x)$$

$$I_2''(x) = I(x) - I_2'(x)$$

$$I_3''(x) = I(x) - I_3'(x)$$

$$I_4''(x) = I(x) - I_4'(x)$$

As for the Y direction, the unperceivable-low-frequency-component-excluded fluctuation components are identified according to formulas similar to those described above. In this first sub-process, there are identified the four unperceivable-low-frequency-component-excluded fluctuation components for each of the X direction and Y direction, in accordance with the number of the simulation functions, and the identified unperceivable-low-frequency-component-excluded fluctuation components are stored in the data•program storage portion 80.

Figure 9:
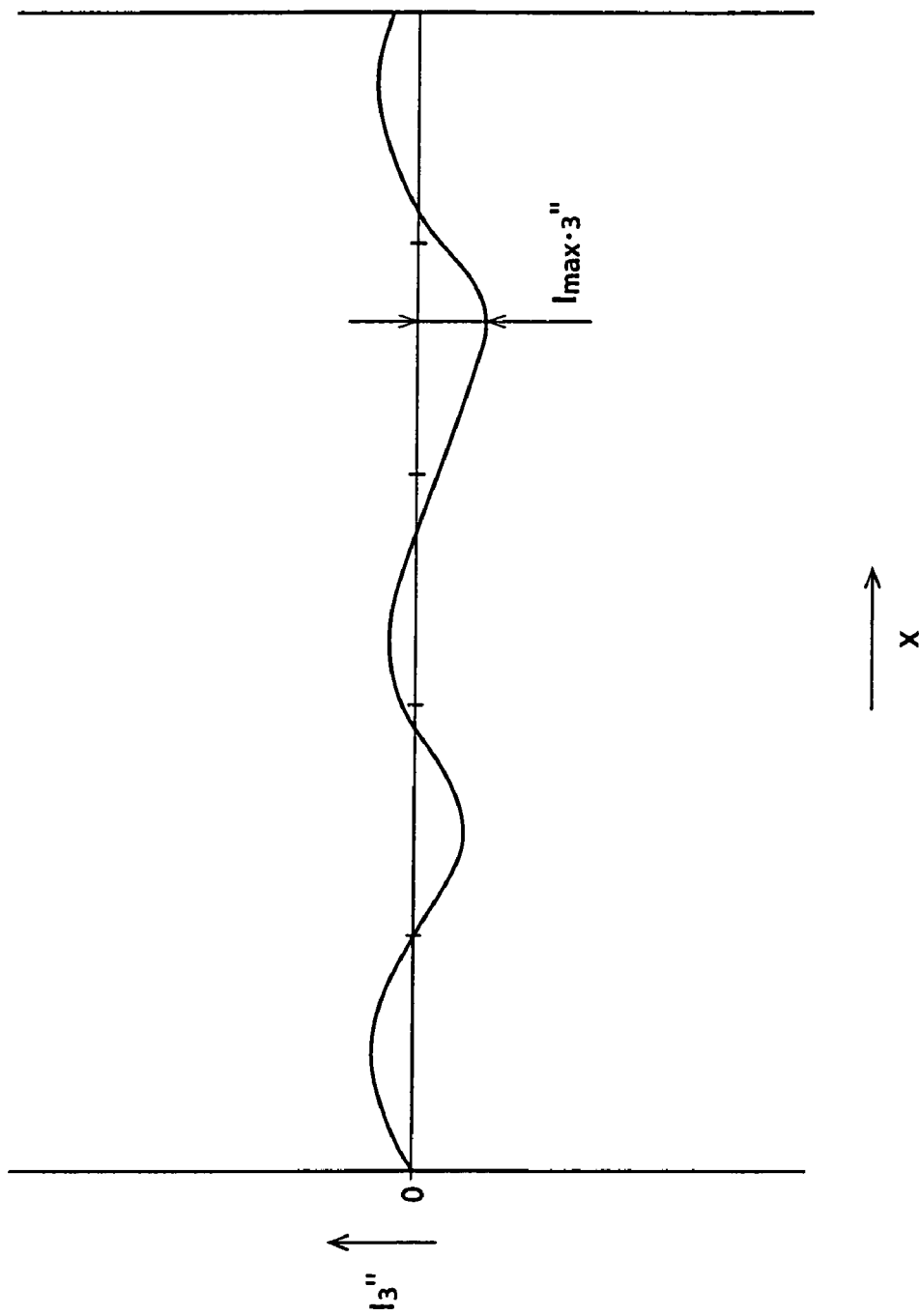
FIG. 9 is a chart schematically indicating an unperceivable-low-frequency-component-excluded fluctuation component which is identified in the process of identifying an unperceivable-low-frequency-component-excluded fluctuation component that partially constitutes the process of identifying an evaluation index.

FIG. 9 shows a chart schematically indicating, as a representative of the four unperceivable-low-frequency-component-excluded fluctuation components identified for the X direction, the unperceivable-low-frequency-component-excluded fluctuation component $I_3''(x)$ corresponding to the unperceivable low-frequency-fluctuation component $I_3'(x)$ estimated in the form of the third-order simulation function. It is recognized from the chart that the unperceivable low-frequency-fluctuation component has been effectively excluded by the operation in the first sub-process described above, so that a perceivable, relatively long-cycle fluctuation component clearly emerges. It is noted that the unperceivable-low-frequency-component-excluded fluctuation component shown in the chart of FIG. 9 has a cycle corresponding to about several fractions of the longitudinal dimension of the A4 size. This cycle coincides with a circumference of the feeding roller 28 of the feeder 26. Therefore, it is considered that the unperceivable-low-frequency-component-excluded fluctuation component having such a cycle is possibly a fluctuation component due to eccentricity of the axis of the feeding roller 28, in other words, due to deviation of the axis of the feeding roller 28 from the predetermined nominal position.

(ii) Second Sub-Process of Tentatively Identifying Evaluation Index (Second Sub-Step of Tentatively Identifying Evaluation Index)

Subsequently, the second sub-process of tentatively identifying evaluation indices is performed by executing S25. In this second sub-process, there are obtained, for each of the X direction and the Y direction, maximum values $I_{MAX}\cdot1''$~$I_{MAX}\cdot4''$ which are maximum values of absolute values of the respective four unperceivable-low-frequency-component-excluded fluctuation components stored in the data program storage portion 80. Each of the obtained maximum values is tentatively identified as an evaluation index. The maximum value $I_{MAX}\cdot3''$ of the unperceivable-low-frequency-component-excluded fluctuation component $I_3''(x)$ is a value shown in the chart of FIG. 9. The maximum values are tentatively identified as the evaluation indices, and the thus identified evaluation indices are stored in the data•program storage portion 80.

(iii) Third Sub-Process of Selecting Evaluation Index (Third Sub-Step of Selecting Evaluation Index)

Next, the third sub-process of selecting the evaluation index is performed by executing S26. In this third sub-process, one evaluation index is selected, as the evaluation sub-process, one evaluation index is selected, as the evaluation index in the evaluation-index identifying process, among the stored four maximum values $I_{MAX}\cdot1''$~$I_{MAX}\cdot4''$ which have been tentatively identified for each of the X direction and the Y direction, on the basis of interrelationship of the four maximum values $I_{MAX}\cdot1''$~$I_{MAX}\cdot4''$. More specifically described, the smallest one $[I_{MAX}'']_{MIN}$ of the four maximum values $I_{MAX}\cdot1''$~$I_{MAX}\cdot4''$ is selected as one evaluation index.

As explained above, each of the four simulation functions approximates the unperceivable low-frequency-fluctuation component, and it is therefore unclear which one of the four estimated unperceivable low-frequency-fluctuation components is the most accurately estimated component. In the light of this, the smallest maximum value $[I_{MAX}'']_{MIN}$ is identified as one evaluation index by regarding the smallest maximum value $[I_{MAX}'']_{MIN}$ as an evaluation index based on the most accurately estimated unperceivable low-frequency-fluctuation component.

[F] Evaluation Judging Process (Evaluation Judging Step)

The following evaluation judging process is performed by the evaluation judging portion 72 and by execution of S27. In this evaluation judging process, it is judged whether or not the smallest maximum value $[I_{MAX}'']_{MIN}$ identified as the evaluation index for each of the X direction and the Y direction is larger than a predetermined threshold $I_s''$. Where the smallest maximum value $[I_{MAX}'']_{IN}$ is larger than the threshold $I_s''$ in either of the X direction and Y direction, the image forming characteristic of the printing device is judged to be poor. Where the smallest maximum value $[I_{MAX}'']_{MIN}$ is not larger than the threshold $I_s''$ in both of the X direction and Y direction, the image forming characteristic of the printing device is judged to be good.

[G] Evaluation-Related-Information Outputting Process (Evaluation-Related-Information Outputting Step)

The following evaluation-related-information outputting process is performed by the evaluation-related-information-outputting control portion 74 and by executing S28. In this process, the result of judgment described above and the evaluation index identified for each of the X direction and the Y direction are outputted as evaluation-related information. More specifically explained, there is generated a command to indicate the evaluation-related information on the operating panel 18, so that the information is indicated on a display of the operating panel 18.

The above-indicated processes are performed in order, whereby the series operation of supporting the evaluation of the image-forming characteristic of the printing device 12 is completed. The evaluation-related information indicated on the operating panel 18 is useful in the evaluation of the image forming characteristic. The present printer 10 is capable of outputting such useful information by its own operation, so that the printer 10 assures high utility. Owing to the above-described supporting operation, the irregularity of the evaluation image, in detail, the degree of the irregularity due to the relatively long-cycle fluctuation in the optical characteristic values is evaluated. Therefore, the supporting operation is arranged to evaluate the image forming characteristic of the printing device 12 by the evaluation of the degree of the irregularity of the evaluation image.

[H] Modified Embodiment of Characteristic-Value-Fluctuation Identifying Process In the characteristic-value-fluctuation identifying process, the characteristic-value fluctuation may be identified, in place of the smoothing operation, by a series of operation in which Fourier transformation, filter operation, and inverse Fourier transformation are performed in order. There will be explained for the X direction. In the characteristic-value-fluctuation identifying process according to the modified embodiment, the values of the lightness L at all coordinate positions in the same X-coordinate position in the evaluation-image data are averaged, and there is formed data L(x) indicative of a one-dimensional fluctuation in the lightness values in relation to the X-coordinate position "x". The data L(x) corresponds to a basic characteristic-value fluctuation. On the basis of the thus formed data L(x), the Fourier transformation is performed according to the following formula (2), whereby a spatial-frequency characteristic function F(u) is obtained.

$$F(u) = \sum_{x=0}^{M-1} L(x) * \exp\left(\frac{-2\pi i x u}{M}\right) \qquad (2)$$

In the above formula (2), "M" is a number of the coordinate positions in the X direction of the evaluation-image data (i.e., a number of the theoretical picture elements). Next, the filter operation is performed according to the following formula, in which the spatial-frequency characteristic function F(u) is multiplied by a visibility filter VTF(u), thereby obtaining a corrected spatial-frequency characteristic function F'(u) on which correction considering the visibility has been made:

$$F'(u)=VTF(u)*F(u)$$

Figure 10:
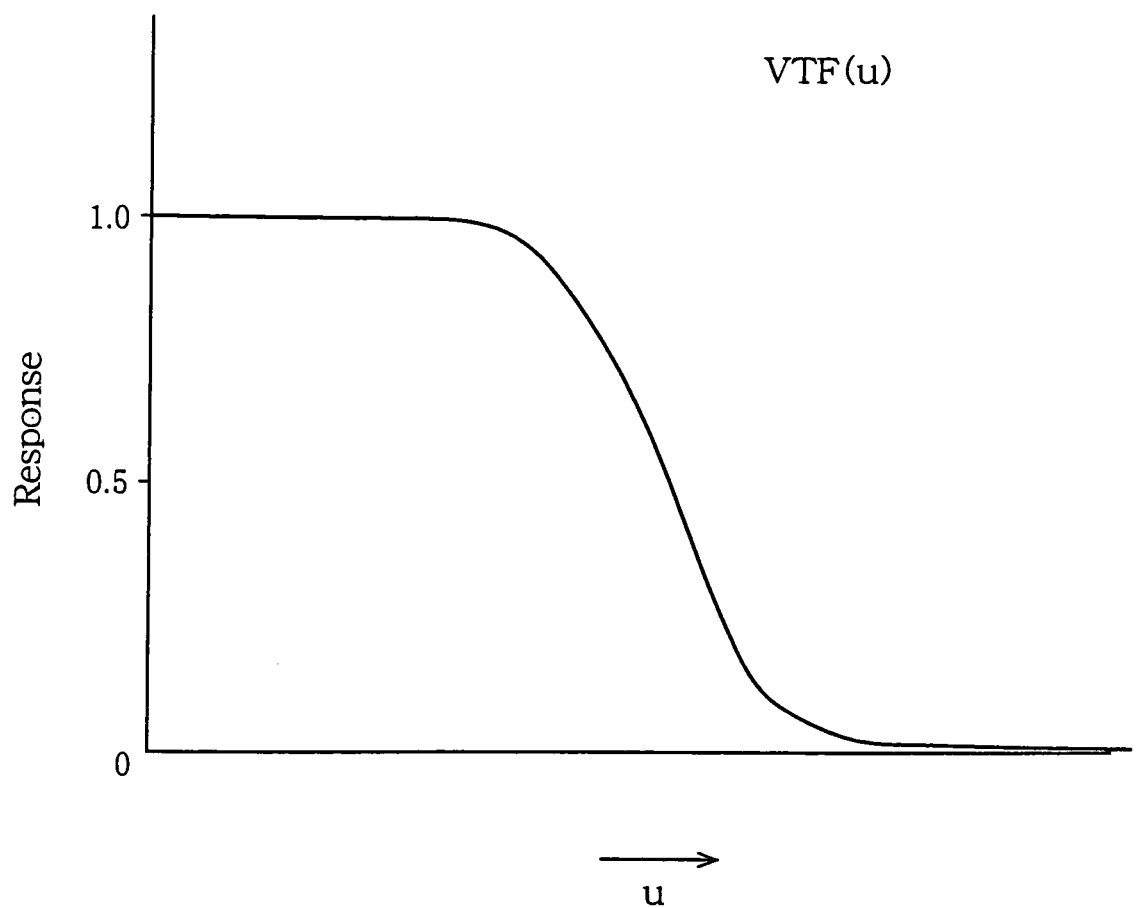
FIG. 10 is a chart indicating a profile of VTF utilized in filter operation performed in the process of identifying a characteristic-value fluctuation as a modified embodiment.

Here, because the VTF(u) used in the filter operation functions as a high-frequency-cut filter, it has a profile shown in FIG. 10 and it is a function arranged not to exclude the low-frequency component. The VTF(u) may be arranged to at least exclude the unperceivable high-frequency fluctuation component. Accordingly, it may be possible to arbitrarily determine, depending upon the evaluation purpose, as to the degree of the high-frequency component to be excluded. Subsequently, the inverse Fourier transformation according to the following formula is performed on the corrected spatial-frequency characteristic function F'(u), thereby identifying a corrected fluctuation I(x):

$$I(x)=FFT^{-1}(F'(u))$$

In the above formula, "$FFT^{-1}$" is an inverse function of the transformation function indicated by the above formula (2). By the series of operation described above, it is possible to identify the characteristic-value fluctuation form which the unperceivable high-frequency fluctuation component has been at least excluded. The characteristic-value fluctuation is identified for the Y direction by operation similar to that explained above.

In the above-indicated characteristic-value-fluctuation identifying process which employs the Fourier transformation, the filter operation, and the inverse Fourier transformation, it may be possible to identify a characteristic-value fluctuation in which the direction is not specified (i.e., a radial characteristic-value fluctuation in which the orientation is not specified), by performing, on lightness data related to the two-dimensional rectangular coordinate system, two-dimensional Fourier transformation, transormation into a polar coordinate system, the filter operation, and the inverse Fourier transformation in order. Such a series of operation is generally known, and a detailed explanation of which is dispensed with.

[I] Other Embodiments

In the illustrated embodiment, the monocolor image with black is used as the evaluation image. A color image formed by using inks of a plurality of colors may be used as the evaluation image for evaluating the image forming characteristic of the printing device 12. In this instance, the series of operation may be performed with respect to not only the lightness L* of the L*a*b* colorimetric system, but also the values a*, b* as the optical characteristic values, and the evaluation index/indices may be identified based on the characteristic-value fluctuations and the unperceivable low-frequency-fluctuation components of those values a*, b*, thereby performing the evaluation judgment. Where the supporting operation is performed using the color image as the evaluation image, the fluctuation in the color, and accordingly, the interrelation of the image forming characteristic for the inks of the plurality colors can also be evaluated.

In the illustrated embodiment, as the evaluation index, the maximum value of the unperceivable-low-frequency-component-excluded fluctuation component is identified and outputted. Where the there is high tendency that the unperceivable-low-frequency-component-excluded fluctuation component is a periodic fluctuation component, for instance, the data related to the cycle or wavelength may be identified and outputted as the evaluation index. In a case where the image forming characteristic is poor, for instance, the cause of the poor image forming characteristic may be estimated based on such period data.

<Remarks>

The illustrated embodiment is related to the image processing apparatus having the image-characteristic-evaluation supporting device and functions of executing the image-forming-characteristic-evaluation supporting program and the supporting operation. Since the embodiment relates to the method of evaluating the image forming characteristic by performing the supporting operation, the embodiment relates to the method of supporting the evaluation of the image forming characteristic. Further, in the present embodiment, the evaluation of the evaluation image is performed on the premises that the supporting operation is carried out. In this respect, the embodiment relates to the image evaluation method, the image-evaluation supporting device, and the image-evaluation supporting program.

What is claimed is:

1. A method of evaluating an image, comprising:
   (a) obtaining evaluation-image data of an evaluation image to be evaluated by a processor, the evaluation-image data including coordinate-position data indicative of coordinate positions in the evaluation image and optical-characteristic-value data indicative of optical characteristic values at respective coordinate positions;
   (b) identifying, based on the evaluation-image data, by a processor, a characteristic-value fluctuation which is a fluctuation of the optical characteristic values of the evaluation image in relation to the coordinate positions;
   (c) estimating, based on the evaluation-image data, by a processor, an unperceivable low-frequency-fluctuation component which is one component of the characteristic-value fluctuation and which is a component that cannot be perceived due to a considerably low frequency of the fluctuation, by forming, based on the evaluation-image data, at least one simulation function each of which simulates the unperceivable low-frequency fluctuation component and each of which uses a coordinate position as a variable; and
   (d) evaluating the evaluation image by a processor based on the characteristic-value fluctuation and the unperceivable low-frequency-fluctuation component.

2. The method according to claim 1, wherein (d) the step of evaluating the evaluation image comprises evaluating a degree of irregularity in the evaluation image.

3. The method according to claim 1,
   wherein (b) the step of identifying a characteristic-value fluctuation comprises identifying the characteristic-value fluctuation in a specific direction of the evaluation image,
   wherein (c) the step of estimating an unperceivable low-frequency-fluctuation component comprises estimating the unperceivable low-frequency-fluctuation component in the specific direction of the evaluation image, and
   wherein (d) the step of evaluating the evaluation image comprises evaluating the evaluation image in the specific direction.

4. The method according to claim 1, wherein (d) the step of evaluating the evaluation image comprises: identifying, based on the characteristic-value fluctuation and the unperceivable low-frequency-fluctuation component, an evaluation index which is an index in the step of evaluating the evaluation image; and evaluating the evaluation image based on the evaluation index.

5. The method according to claim 1, wherein (d) the step of evaluating the evaluation image comprises: identifying an unperceivable-low-frequency-component-excluded fluctuation component of the evaluation image in relation to the coordinate positions, the unperceivable-low-frequency-component-excluded fluctuation component being obtained by excluding the unperceivable low-frequency-fluctuation component from the characteristic-value fluctuation; and evaluating the evaluation image based on the unperceivable-low-frequency-component-excluded fluctuation component.

6. The method according to claim 5, which is a method wherein an evaluation index which is an index in the step of evaluating the evaluation image is identified based on the characteristic-value fluctuation and the unperceivable lowfrequency-fluctuation component, and wherein the evaluation image is evaluated based on the evaluation index, and wherein (d) the step of evaluating the evaluation image comprises: identifying the evaluation index based on the unperceivable-low-frequency-component-excluded fluctuation component; and evaluating the evaluation image based on the evaluation index.

7. The method according to claim 6, wherein (d) the step of evaluating the evaluation image comprises: identifying, as the evaluation index, a maximum value of an absolute value of the unperceivable-low-frequency-component-excluded fluctuation component; and evaluating the evaluation image based on the maximum value.

8. The method according to claim 1, which is a method wherein the characteristic-value fluctuation is identified in a specific direction of the evaluation image, wherein the unperceivable low-frequency-fluctuation component is estimated in the specific direction of the evaluation image, and wherein the evaluation image is evaluated in the specific direction, and wherein (c) the step of estimating an unperceivable low-frequency-fluctuation component comprises forming, as each of the at least one simulation function, a function of an n-th order which uses the coordinate position in the specific direction as a variable.

9. The method according to claim 1, wherein (c) the step of estimating an unperceivable low-frequency-fluctuation component comprises forming the at least one simulation function by performing operation according to a least square method on the evaluation-image data.

10. The method according to claim 1, wherein (c) the step of estimating an unperceivable low-frequency-fluctuation component comprises forming the at least one simulation function whose order is in a range of 1-4.

11. The method according to claim 1, wherein (c) the step of estimating an unperceivable low-frequency-fluctuation component comprises forming a plurality of simulation functions having mutually different numbers of order.

12. The method according to claim 11, which is a method wherein an unperceivable-low-frequency-component-excluded fluctuation component of the evaluation image in relation to the coordinate positions is identified, the unperceivable-low-frequency-component-excluded fluctuation component being obtained by excluding the unperceivable low-frequency-fluctuation component from the characteristic-value fluctuation, and wherein the evaluation image is evaluated based on the unperceivable-low-frequency-component-excluded fluctuation component, and wherein (c) the step of estimating an unperceivable low-frequency-fluctuation component comprises estimating a plurality of the unperceivable-low-frequency-component-excluded fluctuation components by the plurality of simulation functions, respectively, and wherein (d) the step of evaluating the evaluation image comprises evaluating the evaluation image based on the plurality of the unperceivable-low-frequency-component-excluded fluctuation components.

13. The method according to claim 12, which is a method wherein an evaluation index which is an index in the step of evaluating the evaluation image is identified on the basis of the unperceivable-low-frequency-component-excluded fluctuation component which is based on the characteristic-value fluctuation and the unperceivable low-frequency-fluctuation component, and wherein the evaluation image is evaluated based on the evaluation index, and wherein (d) the step of evaluating the evaluation image comprises: identifying a plurality of the evaluation indices based on the plurality of the unperceivable-low-frequency-component-excluded fluctuation components; and evaluating the evaluation image based on the plurality of the evaluation indices.

14. The method according to claim 13, wherein (d) the step of evaluating the evaluation image comprises: selecting, based on interrelationship of the plurality of the evaluation indices, one evaluation index to be utilized in the step of evaluating the evaluation image; and evaluating the evaluation image based on the selected one evaluation index.

15. The method according to claim 1, wherein (b) the step of identifying a characteristic-value fluctuation comprises identifying the characteristic-value fluctuation from which an unperceivable high-frequency fluctuation component has been at least excluded.

16. The method according to claim 15, wherein (b) the step of identifying a characteristic-value fluctuation comprises identifying the characteristic-value fluctuation component from which the unperceivable high-frequency fluctuation component has been at least excluded with a result of performing of smoothing operation on the evaluation-image data.

17. The method according to claim 15, wherein (b) the step of identifying a characteristic-value fluctuation comprises: identifying a basic characteristic-value fluctuation which is a basis of the characteristic-value fluctuation; forming spatial-frequency characteristic data by performing Fourier transformation on the basic characteristic-value fluctuation; performing filter operation on the spatial-frequency characteristic data for excluding at least the unperceivable high-frequency component; and performing inverse Fourier transformation on the spatial-frequency characteristic data which has been subjected to the filter operation.

18. A device for supporting evaluation of an image, comprising:
a processor,
a memory including machine executable instructions that implement;
an evaluation-image-data obtaining portion which obtains evaluation-image data of an evaluation image to be evaluated, the evaluation-image data including coordinate-position data indicative of coordinate positions in the evaluation image and optical-characteristic-value data indicative of optical characteristic values at respective coordinate positions;
a characteristic-value-fluctuation identifying portion which identifies, based on the evaluation-image data, a characteristic-value fluctuation which is a fluctuation of the optical characteristic values of the evaluation image in relation to the coordinate positions;
an unperceivable-low-frequency-fluctuation-component estimating portion which estimates, based on the evaluation-image data, an unperceivable low-frequency-fluctuation component which is one component of the characteristic-value fluctuation and which is a component that cannot be perceived due to a considerably low frequency of the fluctuation by forming, based on the evaluation-image data, at least one simulation function each of which simulates the unperceivable low-frequency fluctuation component and each of which uses a coordinate position as a variable; and
an evaluation-index identifying portion which identifies, based on the characteristic-value fluctuation and the unperceivable low-frequency-fluctuation component, an evaluation index which is an index in evaluating the evaluation image.

19. A recording medium in which an image-evaluation supporting program executed by a computer for evaluating an image is readably recorded, wherein the program comprises:
obtaining evaluation-image data of an evaluation image to be evaluated, the evaluation-image data including coordinate-position data indicative of coordinate positions in the evaluation image and optical-characteristic-value data indicative of optical characteristic values at respective coordinate positions;
identifying, based on the evaluation-image data, a characteristic-value fluctuation which is a fluctuation of the optical characteristic values of the evaluation image in relation to the coordinate positions;
estimating, based on the evaluation-image data, an unperceivable low-frequency-fluctuation component which is one component of the characteristic-value fluctuation and which is a component that cannot be perceived due to a considerably low frequency of the fluctuation, by forming, based on the evaluation-image data, at least one simulation function each of which simulates the unperceivable low-frequency fluctuation component and each of which uses a coordinate position as a variable; and
identifying, based on the characteristic-value fluctuation and the unperceivable low-frequency-fluctuation component, an evaluation index which is an index in evaluating the evaluation image.

20. The method according to claim 1, wherein the unperceivable low-frequency-fluctuation component is estimated without using spatial-frequency processing.

21. The method according to claim 8, wherein at least one of four functions respectively defined by the following formulas is formed as said each of the at least one simulation function in the step of estimating an unperceivable-low-frequency-fluctuation-component:

$$I_1'(x)=a_1*x+b_1$$

$$I_2'(x)=a_2*x^2+b_2*x+c_2$$

$$I_3'(x)=a_3*x^3+b_3*x^2+c_3*x+d_3$$

$$I_4'(x)=a_4*x^4+b_4*x^3+c_4*x^2+d_4*x+e_4,$$

wherein "x" represents the coordinate position in the specific direction as the variable, each of "$I_1'(x)$-$I_4'(x)$" represents the unperceivable low-frequency-fluctuation component in accordance with the coordinate position, and "$a_1$-$a_4$", "$b_1$-$b_4$", "$c_2$-$c_4$" "$d_3$-$d_4$", and "$e_4$" are constants.

* * * * *

UNITED STATES PATENT AND TRADEMARK OFFICE
CERTIFICATE OF CORRECTION

PATENT NO. : 7,643,656 B2  Page 1 of 1
APPLICATION NO. : 11/213921
DATED : January 5, 2010
INVENTOR(S) : Masashi Ueda It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1138 days.

Signed and Sealed this

Sixteenth Day of November, 2010

David J. Kappos
*Director of the United States Patent and Trademark Office*